(12) United States Patent
Oka et al.

(10) Patent No.: US 9,046,432 B2
(45) Date of Patent: Jun. 2, 2015

(54) SENSOR DEVICE, SENSOR MODULE, FORCE SENSING APPARATUS, AND ROBOT

(71) Applicant: Seiko Epson Corporation, Tokyo (JP)

(72) Inventors: Hideaki Oka, Minowa (JP); Toshiyuki Kamiya, Fujimi (JP); Hiroki Kawai, Chino (JP)

(73) Assignee: Seiko Epson Corporation (JP)

( * ) Notice: Subject to any disclaimer, the term of this patent is extended or adjusted under 35 U.S.C. 154(b) by 26 days.

(21) Appl. No.: 13/719,985

(22) Filed: Dec. 19, 2012

(65) Prior Publication Data

US 2013/0152701 A1  Jun. 20, 2013

(30) Foreign Application Priority Data

Dec. 20, 2011  (JP) .................................. 2011-278968

(51) Int. Cl.
| | |
|---|---|
| *G01L 1/22* | (2006.01) |
| *G01L 5/16* | (2006.01) |
| *B25J 9/16* | (2006.01) |
| *G01L 5/22* | (2006.01) |
| *G01L 1/16* | (2006.01) |

(52) U.S. Cl.
CPC ............... *G01L 5/167* (2013.01); *B25J 9/1633* (2013.01); *G01L 5/226* (2013.01); *G01L 1/16* (2013.01)

(58) Field of Classification Search
USPC ...................................... 73/862.044
See application file for complete search history.

(56) References Cited

U.S. PATENT DOCUMENTS

| | | | |
|---|---|---|---|
| 4,802,371 A | | 2/1989 | Calderara et al. |
| 4,821,584 A | * | 4/1989 | Lembke ..................... 73/862.68 |
| 4,974,454 A | * | 12/1990 | Wolfer et al. ............. 73/862.541 |
| 4,982,608 A | * | 1/1991 | Marki et al. ..................... 73/756 |
| 5,297,430 A | | 3/1994 | Sonderegger et al. |
| 7,659,654 B2 | * | 2/2010 | Kondo .......................... 310/330 |
| 7,839,056 B2 | * | 11/2010 | Friedl ........................... 310/338 |
| 8,556,227 B2 | * | 10/2013 | Buestgens et al. ....... 251/129.01 |
| 2012/0260745 A1 | | 10/2012 | Tsuchiya et al. |

FOREIGN PATENT DOCUMENTS

| | | |
|---|---|---|
| JP | 04-231827 | 8/1992 |
| JP | 2012-173079 | 9/2012 |
| JP | 2012-220462 | 11/2012 |

* cited by examiner

*Primary Examiner* — Lisa Caputo
*Assistant Examiner* — Octavia D. Hollington
(74) *Attorney, Agent, or Firm* — Harness, Dickey & Pierce, P.L.C.

(57) ABSTRACT

A sensor device includes a package, a sensor element that is disposed in the package, and a lid that seals the package. The lid includes a flexible portion that surrounds the vicinity of the sensor element in a plan view.

16 Claims, 15 Drawing Sheets

$Fx = Fx1 + Fx2 + Fx3 + Fx4$
$Fy = Fy1 + Fy2 + Fy3 + Fy4$
$Fz = Fz1 + Fz2 + Fz3 + Fz4$
$Mx = b \times (Fz4 - Fz2)$
$My = a \times (Fz3 - Fz1)$
$Mz = b \times (Fz2 - Fz4) + a \times (Fy1 - Fy3)$

SENSOR DEVICE, SENSOR MODULE, FORCE SENSING APPARATUS, AND ROBOT

BACKGROUND

1. Technical Field

The present invention relates to a sensor device, a sensor module, a force sensing apparatus, and a robot.

2. Related Art

In the related art, a force sensor disclosed in JP-A-4-231827 is known as a force sensor used with piezoelectric materials. The disclosed force sensor has a configuration in which a signal electrode 15 shown in FIG. 15 of JP-A-4-231827 is interposed between crystalline circular plates 16 which are piezoelectric materials, and a plurality of measuring elements which are interposed between metal cover circular plates 17 are disposed in a metal ring 14 by welding as shown in FIG. 4 of JP-A-4-231827.

FIG. 14 shows a sensor device of the related art. As shown in FIG. 14, a sensor device 200 includes a sensor element 214, a metallic package 202 including a recess accommodating the sensor element 214, a metallic plate-like lid 204 which is joined to an upper surface (joint surface 224) which is an outer periphery of an opening portion 220 of the recess of the package 202 and comes in contact with the sensor element 214.

In the sensor element 214, a sensing electrode 218 is interposed between two opposed crystal plates 216 having the same cut surface with the sensor element. The upper surface of the crystal plate 216 is a force receiving surface 222 of the sensor element 214, and comes in contact with the lid 204.

Meanwhile, a coaxial connector 206 is attached to the side surface of the package 202. The coaxial connector 206 includes an outer periphery portion 208 and a center conductor 210, an insulating resin 212 is filled therebetween, and the outer periphery portion 208 and the center conductor 210 are electrically insulated from each other. Herein, the outer periphery portion 208 is short-circuited with the package 202 and the lid 204, and the center conductor 210 is electrically connected to the sensing electrode 218.

The sensor device 200 is interposed between pressurization plates (not shown) to receive pressure, and the lid 204 transfers a force (pressure) to the force receiving surface 222 of the sensor element 214. Then, the crystal plates 216 output (induce) an electric charge to the sensing electrode 218 by a piezoelectric effect caused by the pressurization. A force (pressure) to be applied to the crystal plates 216 changes according to an external force to be applied to the pressurization plates. Accordingly, it is possible to sense an external force applied to the sensor device 200 by monitoring an amount of change in an output electric charge due to the change of the force (pressure) through the coaxial connector 206, with an output of the signal in a case of only the pressurization as a reference.

Herein, in the sensor device 200, the sensor element 214 is sealed by the lid 204 in a state where the inside of the package 202 is full of dry air, so that the electric charge induced from the crystal plate 216 does not leak to the external portion by moisture or the like.

The force sensor disclosed in JP-A-4-231827 has a structure in which a signal electrode is interposed between crystalline circular plates, and the crystalline circular plates are interposed between metallic cover circular plates. In a case of attaching this to a metallic ring by welding, the individual portions such as a signal electrode and the like have dimensional errors and it becomes a concavity and convexity of the welded portion, and there is a concern that gaps may be generated in welding. Accordingly, in a state of an adverse external environment such as high humidity, there is a concern that the electric charge may leak to the external portion by an infiltration of moisture to the sensor element, so that a stable measurement is difficult.

In the sensor device of the related art shown in FIG. 14, a height of the force receiving surface 222 of the sensor element 214 accommodated in the package 202 and a height of a joint surface 224 which is an outer periphery of the opening portion 220 of the recess of the package 202 do not coincide with each other, in some cases.

FIGS. 15A and 15B show schematic views in a case where a force is applied to the sensor device (height of force receiving surface<height of joint surface) of the related art. FIG. 15A shows a schematic view before applying a force to the lid, and FIG. 15B shows a schematic view after applying the force to the lid. As shown in FIG. 15A, in a case where the height of the force receiving surface 222 of the sensor element 214 is lower than the height of the joint surface 224, the lid 204 is joined to the package 202. Then, a gap 226 is formed without a contact of the lid 204 and the force receiving surface 222 of the sensor element 214.

FIGS. 16A to 16C show schematic views of the sensor device (height of force receiving surface>height of joint surface) of the related art. FIG. 16A shows a schematic view before joining to the lid, FIG. 16B shows a schematic view after joining to the lid and before applying a force to the lid, and FIG. 16C shows a schematic view after applying the force to the lid.

As shown in FIG. 16A, in a case where the height of the force receiving surface 222 of the sensor element 214 is higher than the height of the joint surface 224 of the package 202, when the lid 204 is joined to the package 202, the state shown in FIG. 16B is realized. That is, the center portion of the lid 204 is raised, and a peripheral edge of the force receiving surface 222 of the sensor element 214 comes in contact with the lid 204, however, a gap 228 is formed between the center portion of the force receiving surface 222 of the sensor element 214 and the lid 204.

In all cases, when the force (including the pressurization described above) is applied to the lid 204, the gaps 226 and 228 described above are eliminated. However, as shown in FIG. 15B, a region which is on the outer side with respect to the sensor element 214 of the lid 204 and on the inner side with respect to edge of the opening portion 220 in a plan view when seen in a depth direction of the recess of the package 202, receives stress in a direction (direction of arrow 230) toward to the center of the lid 204. As shown in FIG. 16C, the region which is on the outer side with respect to the sensor element 214 of the lid 204 and on the inner side with respect to the edge of the opening portion 220 in a plan view, receives stress in a direction (direction of arrow 232) radiating from the center of the lid 204. Accordingly, in any of the cases, shear stress (a direction of arrow 234 is a direction of stress) is concentrically applied to the inner edge portion of the sensor element side which is the inner side of the joint portion (joint surface 224) obtained by joining the lid 204 and the package 202. Further, in the sensor device 200 to which a force is repeatedly applied, there is a concern that stress concentration may progress in the inner edge portion of the sensor element side of the joint portion, and the joint of the lid 204 and the package 202 may be degraded so as to break the air-tight seal.

SUMMARY

An advantage of some aspects of the invention is to provide a sensor device, a sensor module, a force sensing apparatus, and a robot capable of stably realizing air-tight sealing of a sensor element accommodated in a package over a long period, by employing a structure in which breakage of the package rarely occurs.

The invention can be implemented as the following forms or application examples.

APPLICATION EXAMPLE 1

This application example is directed to a sensor device including: a first member that includes a recess; a sensor element that is disposed in the recess and includes a piezoelectric body; and a second member that is joined to the first member and seals the recess of the first member, in which, the second member includes a flexible portion having flexibility that surrounds the vicinity of the sensor element in a position which is on the inner side with respect to an edge of an opening portion of the recess and on the outer side with respect to the sensor element in a plan view when seen in a depth direction of the recess.

In the configuration, even when there is a difference in height between a force receiving surface of the sensor element which is opposed to the second member and a joint surface of the first member which is joined to the second member, since the flexible portion is deformed according to the difference in height therebetween by pressurization, it is possible that a force transfer portion which is disposed on an inner side with respect to the flexible portion of the second member comes in contact with the force receiving surface, and stress generated in the second member along with displacement of the force transfer portion is absorbed by a flexural deformation of the flexible portion. Accordingly, it is possible to suppress the transfer of the stress to the joint surface which is disposed on the outer side with respect to the flexible portion, and to suppress a stress concentration in the joint portion of the first member and the second member. Accordingly, it is possible to provide a sensor device which stably realizes air-tight sealing of the sensor element accommodated in the first member over a long period.

APPLICATION EXAMPLE 2

This application example is directed to the sensor device according to Application Example 1, wherein the flexible portion is thinner than the other portions of the second member.

According to this configuration, it is possible to form the flexible portion with a simple configuration.

APPLICATION EXAMPLE 3

This application example is directed to the sensor device according to Application Example 1 or 2, wherein the flexible portion has a bellows structure.

According to this configuration, it is possible to form the flexible portion with a simple configuration.

APPLICATION EXAMPLE 4

This application example is directed to the sensor device according to any one of Application Examples 1 to 3, the flexible portion has a circular shape or a polygonal shape having corners that are arc-like (e.g., aruate) in a plan view.

According to this configuration, it is possible to avoid a concentration of the stress to the specific portion of the flexible portion to improve durability of the flexible portion.

APPLICATION EXAMPLE 5

This application example is directed to the sensor device according to any one of Application Examples 1 to 4, wherein, when a normal direction of the force receiving surface which comes in contact with the second member of the sensor element is set as a Z axis direction, and directions which are perpendicular to the Z axis direction and perpendicular to each other are set as an X axis direction and a Y axis direction respectively, the sensor element includes at least one or more of a first sensor element that senses a force in the X axis direction, a second sensor element that senses a force in the Y axis direction, and a third sensor element that senses a force in the Z axis direction.

According to this configuration, it is possible to sense the force in an arbitrary direction according to the intended purpose.

APPLICATION EXAMPLE 6

This application example is directed to a sensor module including a first member that includes a recess, a sensor element that is disposed in the recess and includes a piezoelectric body, a second member that is joined to the first member and seals the recess of the first member, a first plate that comes in contact with the first member, a second plate that comes in contact with the second member, and a fastening portion that fastens the first plate and the second plate, in which the second member includes a flexible portion having flexibility that surrounds the vicinity of the sensor element in a position which is on the inner side with respect to an edge of an opening portion of the recess and on the outer side with respect to the sensor element in a plan view when seen in a depth direction of the recess.

According to this configuration, it is possible to provide a sensor module which stably realizes air-tight sealing of the sensor element accommodated in the first member over a long period, for the same reason as in Application Example 1.

APPLICATION EXAMPLE 7

This application example is directed to a force sensing apparatus including the sensor device according to any one of Application Examples 1 to 5.

According to this configuration, it is possible to provide a force sensing apparatus which stably realizes air-tight sealing of the sensor element accommodated in the first member over a long period, for the same reason as in Application Example 1.

APPLICATION EXAMPLE 8

This application example is directed to a force sensing apparatus including a first member that includes a recess, a sensor element that is disposed in the recess and includes a piezoelectric body, a second member that is joined to the first member and seals the recess of the first member, and an electronic circuit that is electrically connected to the sensor element, in which the second member includes a flexible portion having flexibility that surrounds the vicinity of the sensor element in a position which is on the inner side with respect to an edge of an opening portion of the recess and on the outer side with respect to the sensor element in a plan view when seen in a depth direction of the recess.

According to this configuration, it is possible to provide a force sensing apparatus which stably realizes air-tight sealing of the sensor element accommodated in the first member over a long period, and uniquely sense a force, for the same reason as in Application Example 1.

APPLICATION EXAMPLE 9

This application example is directed to a robot including the force sensing apparatus according to Application Example 7.

According to this configuration, it is possible to provide a robot which stably realizes air-tight sealing of the sensor element accommodated in the first member over a long period, for the same reason as in Application Example 1.

APPLICATION EXAMPLE 10

This application example is directed to a robot including a main body portion, an arm portion that is connected to the main body portion, a hand portion that is connected to the arm portion, and a sensor device in the connecting portion of the arm portion and the hand portion, in which the sensor device includes a first member that includes a recess, a sensor element that is disposed in the recess and includes a piezoelectric body, and a second member that is joined to the first member and seals the recess of the first member, and the second member includes a flexible portion having flexibility that surrounds the vicinity of the sensor element in a position which is on the inner side with respect to an edge of an opening portion of the recess and on the outer side with respect to the sensor element in a plan view when seen in a depth direction of the recess.

According to this configuration, it is possible to provide a robot which stably realizes air-tight sealing of the sensor element accommodated in the first member over a long period, and senses a force applied to the arm portion and the hand portion, for the same reason as in Application Example 1.

BRIEF DESCRIPTION OF THE DRAWINGS

The invention will be described with reference to the accompanying drawings, wherein like numbers reference like elements.

FIGS. 1A and 1B are schematic views of a sensor device of a first embodiment when a lid is deformed to a convex shape, in which FIG. 1A is a plan view and FIG. 1B is a cross-sectional view taken along a line A-A of FIG. 1A.

FIGS. 2A and 2B are schematic views of manufacturing steps of the sensor device of a first embodiment, in which FIG. 2A is a schematic view before seam welding, and FIG. 2B is a schematic view after seam welding.

FIGS. 3A and 3B are schematic views of a sensor device of a first embodiment when a gap is formed between a lid and a sensor element, in which FIG. 3A is a schematic view before applying pressure, and FIG. 3B is a schematic view after applying pressure.

FIGS. 6A and 6B are schematic views of a modification example of a lid of the embodiment, in which FIG. 6A is a plan view, and FIG. 6B is a cross-sectional view taken along a line A-A of FIG. 6A.

FIGS. 15A and 15B are schematic views when a force is applied to a sensor device (height of a force receiving surface<height of joint surface) of the related art, in which FIG. 15A is a schematic view before a force is applied to a lid, and FIG. 15B is a schematic view after a force is applied to a lid.

FIGS. 16A to 16C are schematic views of a sensor device (height of a force receiving surface<height of joint surface) of the related art, in which FIG. 16A is a schematic view before joining to a lid, FIG. 16B is a schematic view after joining to the lid and before applying a force to the lid, and FIG. 16C is a schematic view after applying the force to the lid.

DESCRIPTION OF EXEMPLARY EMBODIMENTS

Figure 1A:
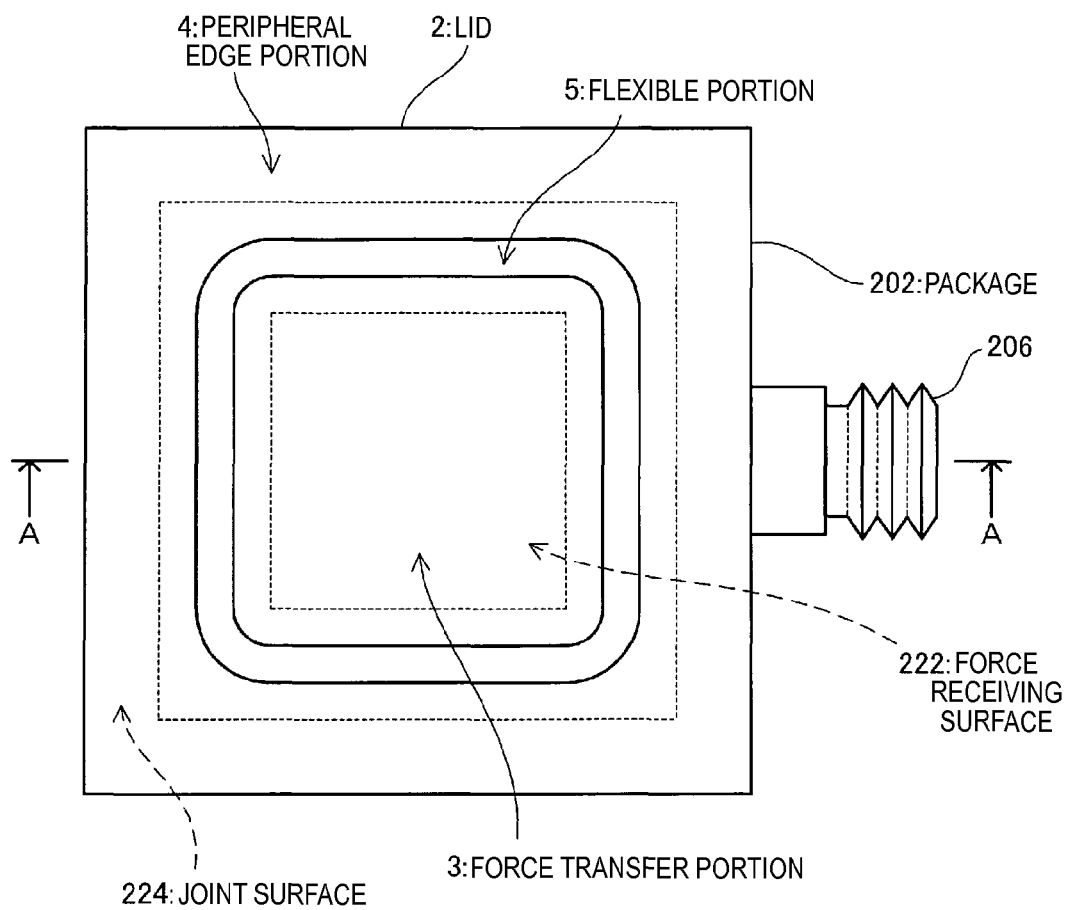

Hereinafter, the invention will be described in detail using embodiments shown in the drawings. However, the invention is not limited to the constituent elements, types, combinations, shapes, relative disposition and the like disclosed in the embodiments, unless otherwise specified, and they are only illustrating examples.

Figure 1B:
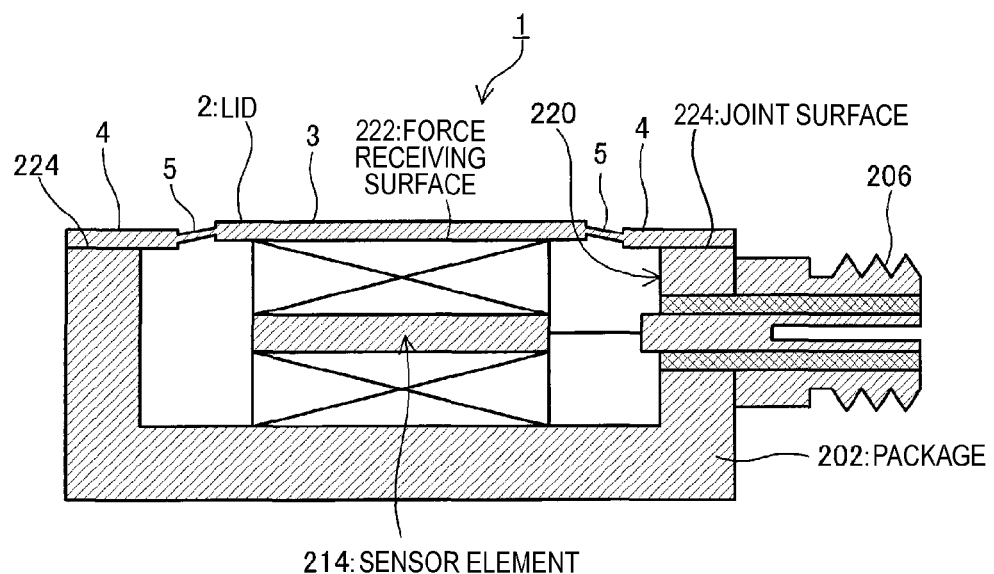

FIGS. 1A and 1B show a sensor device of a first embodiment. Since a sensor device 1 of the first embodiment has a common basic configuration with a sensor device 200 of the related art, the same constituent elements have the same reference numerals and the description thereof is mostly omitted.

First, the embodiment will be described using a case where a force receiving surface 222 (upper surface) of a sensor element 214 is disposed higher than a joint surface 224 (upper surface) of a package 202 (first member) having a recess and a lid 2 (second member).

The sensor device 1 of the embodiment is mainly configured of the package 202 (a housing) having the recess (defined by a circumferential wall), the sensor element 214, and the plate-like lid 2. The sensor device 1 of the embodiment has a basic configuration in which the sensor element 214 is accommodated in the package 202, and the lid 2 is joined to the joint surface 224 of the package 202 so as to cover an opening portion 220 of the recess of the package 202. The package 202 has a package structure including the recess, and formed of metal (or ceramic as will be described later). A flexible portion 5 is disposed between a force transfer portion 3 and a peripheral edge portion 4 of the lid 2 and performs a flexural deformation according to a difference in height of the force receiving surface 222 of the sensor element 214 and the joint surface 224, and a level difference is formed between the force transfer portion 3 and the peripheral edge portion 4. By this level difference, the peripheral edge portion 4 is joined to the joint surface 224 in a state where the force transfer portion 3 comes in contact (surface contact) with the force receiving surface 222. In addition, in the embodiment, the force transfer portion 3 is formed to be protruded (raised) compared to the peripheral edge portion 4.

The sensor device 1 of the embodiment is interposed between pressurization plates 82 (FIG. 11) and 92 (FIG. 12) which will be described later, and receives pressure from a normal direction of the force receiving surface 222 of the sensor element 214, for example.

The lid 2 which is joined to the package 202 is formed of metal (or ceramic as will be described later) such as stainless steel or Kovar, and configured of the force transfer portion 3, the peripheral edge portion 4, and the flexible portion 5. The force transfer portion 3 forms a center region of the lid 2 and transfers a force (including pressurization) received from the outside to the force receiving surface 222 of the sensor element 214. Herein, the force transfer portion 3 has at least a shape to come in contact with the entire force receiving surface 222. At this time, the force transfer portion 3 has a configuration, of at least, having the same shape and the same area as the force receiving surface 222, and being disposed so that the peripheral edge of the force transfer portion 3 and the peripheral edge of the force receiving surface 222 are overlapped with each other in a plan view when seen in the depth direction of the recess of the package 202.

However, as shown in FIGS. 1A and 1B, the force transfer portion 3 may have a larger area than the force receiving surface 222 (in this case, it is not necessary to have the same shape), and may be disposed so that the peripheral edge of the force transfer portion 3 surrounds the peripheral edge of the force receiving surface 222 in the plan view. Accordingly, even when there is an alignment error when joining the lid 2 and the package 202, it is possible that the force transfer portion 3 comes in contact with the entire force receiving surface 222.

The periphery edge portion 4 is disposed in a position which is a peripheral edge of the lid 2, and joined to the joint surface 224 of the package 202.

The flexible portion 5 is a region with a ring-shaped rectangle (square or rectangle) having a position which is on the inner side with respect to the edge of the opening portion 220 in the plan view as an outer periphery, and a position which is on the outer side with respect to the force receiving surface 222 of the sensor element 214 in the plan view as an inner periphery. The flexible portion 5 is formed thinner than the force transfer portion 3 and the peripheral edge portion 4, and is formed in a state of being engraved (recessed from) in both surfaces (may be one surface) of the lid 2. The flexible portion 5 can be formed by press molding or etching. The flexible portion 5 sets the peripheral edge portion 4 side as a fixed end, and the force transfer portion 3 side as a free end, and performs a flexural deformation (extends) in a thickness direction of the lid 2.

As shown in FIG. 1A, the flexible portion 5 is a polygonal shape (rectangular shape in the drawing) and the corners thereof are arc-like (arcuate). Accordingly, it is possible to avoid a concentration of stress to specific portions (for example, corners) of the flexible portion 5 to improve durability of the flexible portion 5.

Next, manufacturing steps of the sensor device 1 of the first embodiment will be described. Herein, steps of accommodating the sensor element 214 in the package 202, and joining the lid 2 and the package 202 by seam welding to air-tightly seal the sensor element 214 will be described.

Figure 2A:
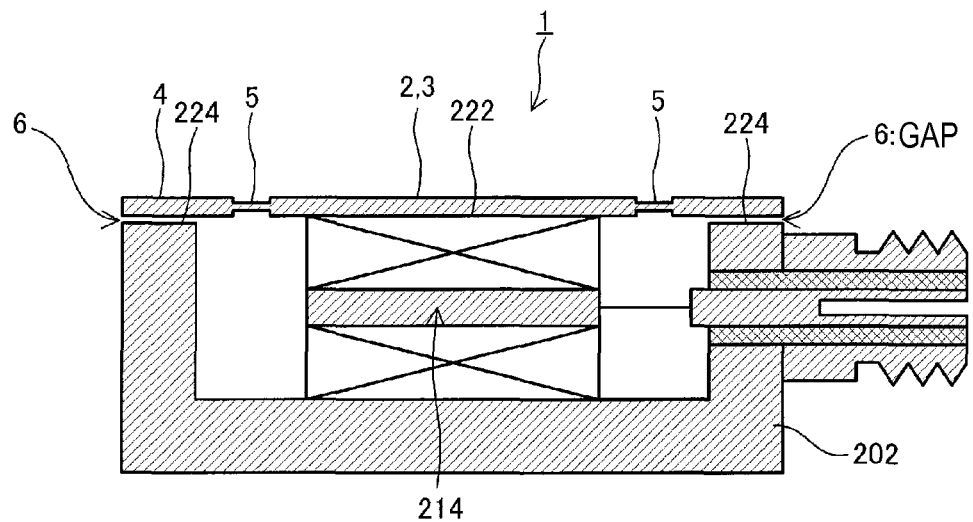
Figure 2B:
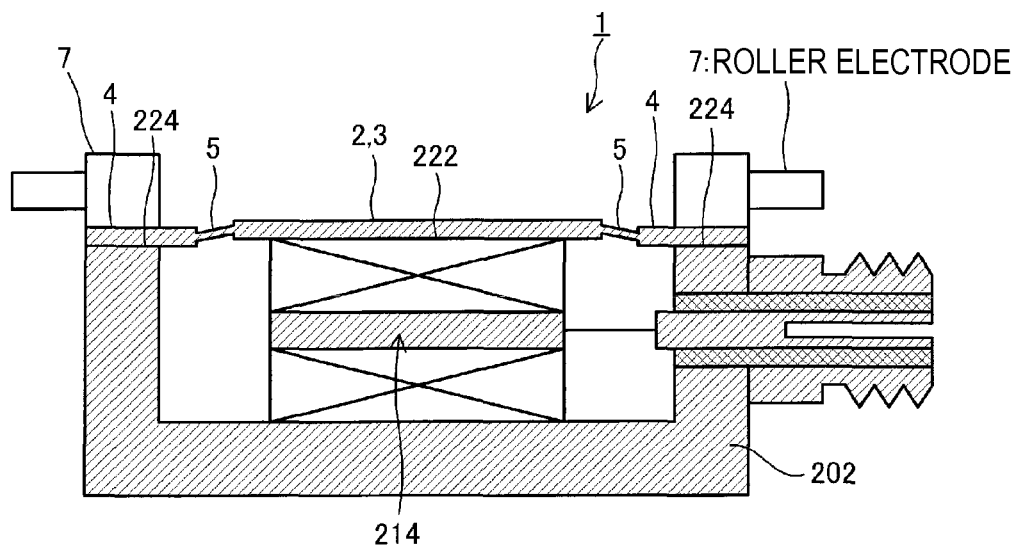

FIGS. 2A and 2B show schematic views of manufacturing steps of the sensor device of the first embodiment, in which FIG. 2A shows a schematic view before the seam welding, and FIG. 2B shows a schematic view after the seam welding.

First, the lid 2 in which the flexible portion 5 is formed in advance is loaded on the package 202 in which the sensor element 214 is accommodated. At this time, the force transfer portion 3 is loaded on the force receiving surface 222 and a gap 6 is formed between the peripheral edge portion 4 and the joint surface 224.

Next, as shown in FIG. 2B, by pressing a roller electrode 7 for the seam welding against the peripheral edge portion 4 to deform the flexible portion 5, the peripheral edge portion 4 is abutted to the joint surface 224 to eliminate the gap 6. Since electric current flows from the roller electrode 7, the peripheral edge portion 4 and the joint surface 224 are joined to each other. By applying the roller electrode 7 on the entire peripheral edge portion 4, the sensor element 214 is air-tightly sealed and the sensor device 1 is formed.

Figure 3A:
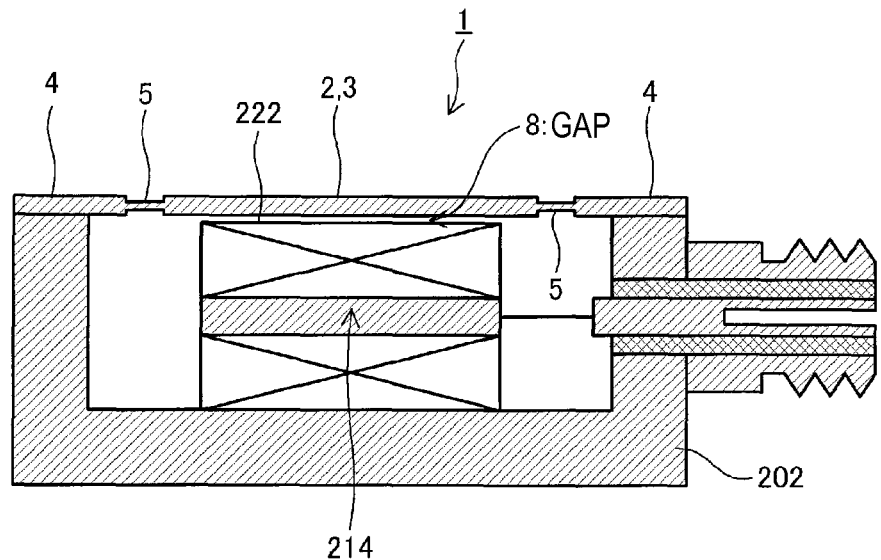
Figure 3B:
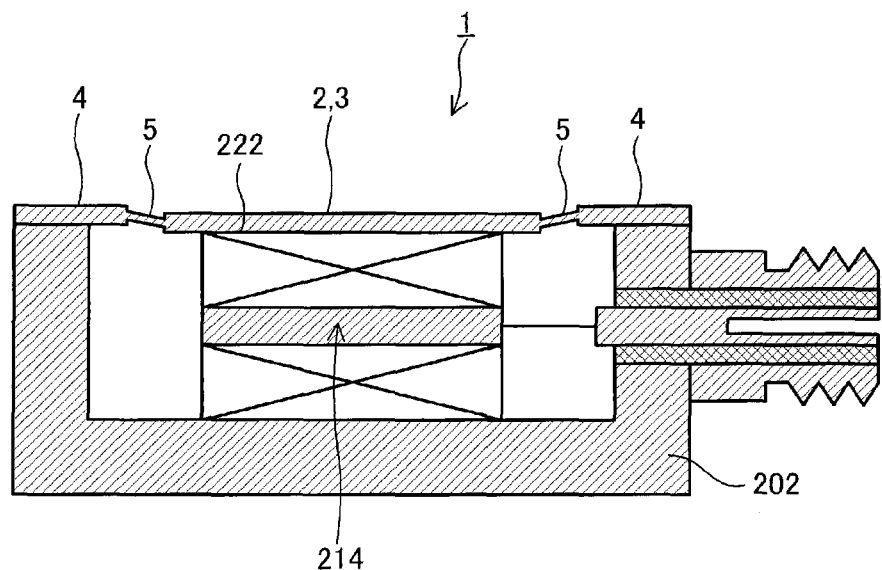
Figure 4:
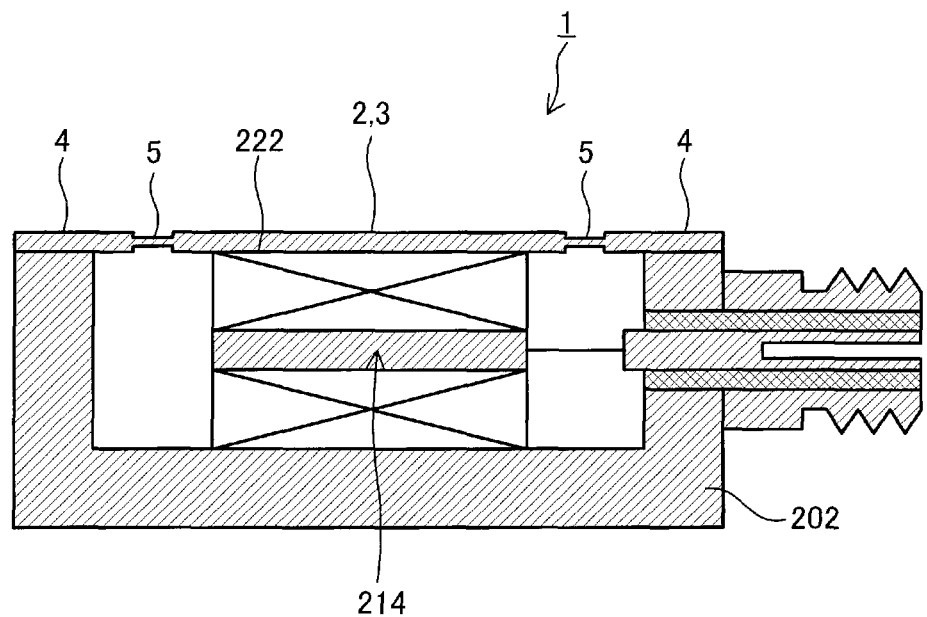
FIG. 4 is a schematic view of a sensor device of a first embodiment, when a lid maintains a flat disposition and comes in contact with a sensor element.

FIGS. 3A and 3B are schematic views of the sensor device of the first embodiment when the gap is formed between the lid and the sensor element, in which FIG. 3A is a schematic view before applying pressure, and FIG. 3B is a schematic view after applying pressure. FIG. 4 is a schematic view of the sensor device of the first embodiment, when the lid maintains a flat disposition and comes in contact with the sensor element. Also in a case of this example, it is possible that the force transfer portion 3 comes in contact with the force receiving surface 222 by using the flexible portion 5, by applying the pressure.

In a case of mass production of the sensor device 1 of the embodiment, a variation is generated in the difference in height between the height of the force receiving surface 222 of the sensor element 214 and the joint surface 224 of the package 202.

As shown in FIGS. 1A and 1B, in a case where the height of the force receiving surface 222 is higher than the height of the joint surface 224, when the peripheral edge portion 4 is joined to the joint surface 224, the flexible portion 5 is deformed (extended) according to the difference in height between the force receiving surface 222 and the joint surface 224. Accordingly, the force transfer portion 3 comes in contact with the force receiving surface 222 and the peripheral edge portion 4 is joined to the joint surface 224.

In contrast to this, the joining method of the lid 2 in cases of FIGS. 3A and 3B, and FIG. 4 is the same as in the case of FIGS. 2A and 2B; however the flexible portion 5 is not deformed when joining. That is, as shown in FIG. 3A, in a case where the height of the force receiving surface 222 is lower than the height of the joint surface 224, even when the peripheral edge portion 4 is joined to the joint surface 224, a gap 8 is formed between the force transfer portion 3 and the force receiving surface 222.

However, the gap 8 is much narrower when compared to the thickness of the lid 2, and in order to be used, pressure is applied from the thickness direction (height direction) of the sensor device 1 by the pressurization plates 82 and 92 (not shown in FIGS. 3A and 3B) which will be described later.

Accordingly, as shown in FIG. 3B, the force transfer portion 3 is displaced to the force receiving surface 222 side, and the gap 8 is eliminated, and the force transfer portion 3 comes in contact with the force receiving surface 222 by the pressurization plates 82 and 92 (not shown in FIGS. 3A and 3B). At this time, the force transfer portion 3 deforms the flexible portion 5 to the force receiving surface 222 side. Then, the flexible portion 5 is deformed according to the difference in height between the force receiving surface 222 and the joint surface 224, and level difference is formed between the peripheral edge portion 4 and the force transfer portion 3.

As shown in FIG. 4, in a case where the height of the force receiving surface 222 and the height of the joint surface 224 coincide with each other, the force transfer portion 3 and the force receiving surface 222 come in contact with each other. Accordingly, in any of the cases of FIGS. 1A and 1B, and FIGS. 3A and 4, in a case where the force transfer portion 3 comes in contact with the force receiving surface 222 by applying the pressure, it is possible that the stress concentration in the joint portion (joint surface 224) of the package 202 and the lid 2 is significantly reduced, and deterioration of the sensor device 1 over time is suppressed.

In the embodiment, since the flexible portion 5 of the lid 2 is deformed, the stress applied to the joint portion of the package 202 and the lid 2 is suppressed. In the lid 2, since the flexible portion 5 is deformed, an amount of the force lost as the stress with respect to the joint portion of the package 202 and the lid 2 from the force applied to the sensor element 214 is significantly small, and the force efficiently transfers to the sensor element 214. As a result, the sensing of the force can be performed with a high degree of precision.

Further, since the flexible portion 5 is deformed according to the difference in height between the force receiving surface 222 and the joint surface 224, the level difference is formed between the force transfer portion 3 and the peripheral edge portion 4. Accordingly, since the force transfer portion 3 comes in contact with the force receiving surface 222 even in a state of not applying the force, it is possible that shear stress or an impact applied to the joint surface 224 is reduced and a concern of breakage of the air-tight seal is reduced.

As described above, according to the sensor device 1 of the first embodiment, even if there is the difference in height between the force receiving surface 222 opposing to the lid 2 of the sensor element 214 and the joint surface 224 joined to the lid 2 of the package 202, since the flexible portion 5 is deformed according to the difference in height thereof by the pressurization, it is possible that the force transfer portion 3 which is disposed on the inner side with respect to the flexible portion 5 of the lid 2 comes in contact with the force receiving surface 222, and the stress generated in the lid 2 with the displacement of the force transfer portion 3 is absorbed by the flexural deformation of the flexible portion 5. Accordingly, it is possible to suppress the transfer of the stress to the joint surface 224 which is disposed on the outer side with respect to the flexible portion 5, and to suppress the stress concentration with respect to the joint portion of the package 202 and the lid 2. Thus, it is possible to provide the sensor device 1 which stably realizes the air-tight sealing of the sensor element 214 accommodated in the package 202 over a long period. In addition, in the embodiment, the sensor element 214 which senses the force uses a piezoelectric effect, the displacement amount of the force transfer portion 3 which is necessary for the sensor element 214 to sense the force can be suppressed to a very small degree, and it is possible to provide the sensor device 1 which can stably perform the sensing of the force with a high degree of precision even with a small displacement amount.

Figure 5:
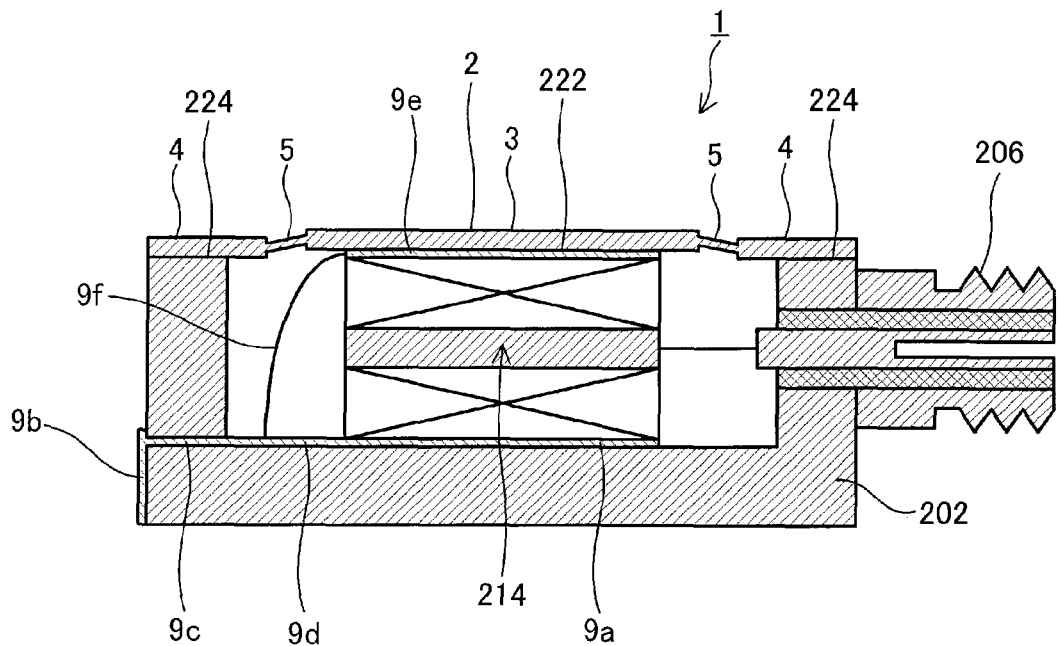
FIG. 5 is a cross-sectional view of a sensor device of a first embodiment when a package and a lid are formed with an insulating body.

FIG. 5 shows a cross-sectional view of the sensor device of the first embodiment when the package and the lid are formed with an insulating body. In a case where the package 202 and the lid 2 are formed with an insulating body such as a ceramic, in the bottom surface of the recess of the package 202, a ground electrode 9a is disposed so as to come in contact with the entire lower surface of the sensor element 214, and a side surface electrode 9b is disposed on the side surface of the outer portion of the package 202. Then, a penetration electrode 9c which penetrates from the side surface electrode 9b to the wall surface of the recess of the package 202 is disposed, and a connection electrode 9d which connects the penetration electrode 9c which is exposed in the wall surface of the recess and the ground electrode 9a is disposed on the bottom surface of the recess of the package 202. Further, a ground electrode 9e is also disposed on the upper surface of the sensor element 214 so as to cover the entire upper surface and the ground electrode 9e and the connection electrode 9d are electrically connected by a wire 9f. In this configuration, since the side surface electrode 9b is grounded, the upper surface and the lower surface of the sensor element 214 are grounded. In this case, the upper surface of the ground electrode 9e becomes the force receiving surface 222 of the sensor element 214.

Figure 6A:
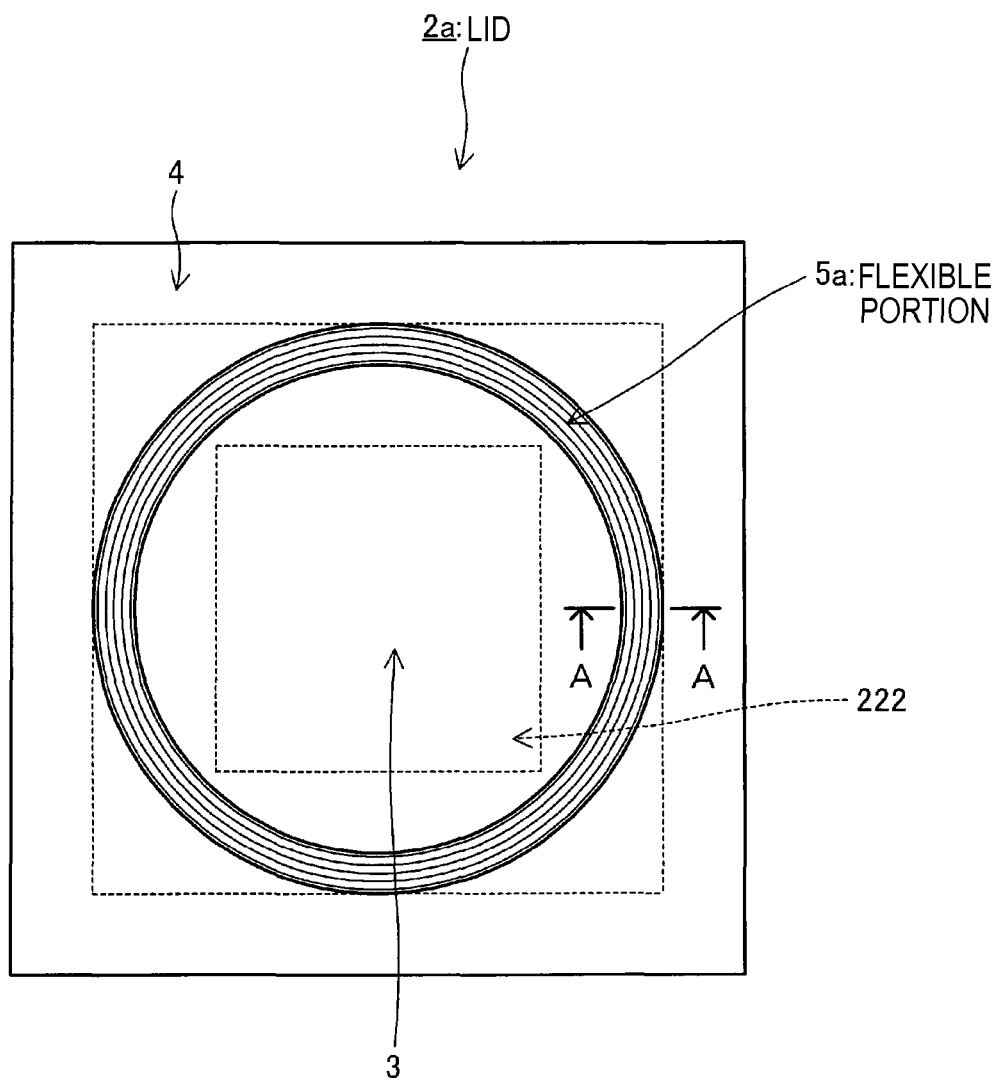
Figure 6B:
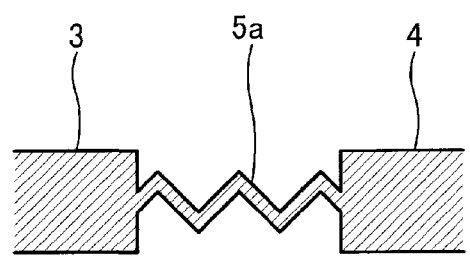

FIGS. 6A and 6B are schematic views of a modification example of the lid of the embodiment, in which FIG. 6A is a plan view, and FIG. 6B is a cross-sectional view taken along a line A-A of FIG. 6A. In a lid 2a shown in FIGS. 6A and 6B, a flexible portion 5a has a circular shape in the plan view. With the configuration of the flexible portion 5a described above, it is possible to avoid a concentration of stress to the specific portions (for example, corner portions) of the flexible portion 5a when applying a force (including pressurization) to the lid 2a, to improve durability of the flexible portion 5a.

In addition, as shown in FIG. 6B, the flexible portion 5a is formed thinner than the force transfer portion 3 and the peripheral edge portion 4, and has a bellows structure. Accordingly, the flexible portion 5a is likely to be deformed, and it is possible to reduce an amount of lost force when the force transfer portion 3 transfers the force to the force receiving surface 222 of the sensor element 214. When the flexible portion has a bellows structure as the flexible portion 5a, as long as the flexible portion 5a is preferentially deformed over the force transfer portion 3 and the peripheral edge portion 4, the flexible portion 5a need not necessarily be formed thinner, and may have the same thickness as the force transfer portion 3 and the peripheral edge portion 4. Also, the lid 2a of the modification example can be formed by press molding or etching.

Figure 7:
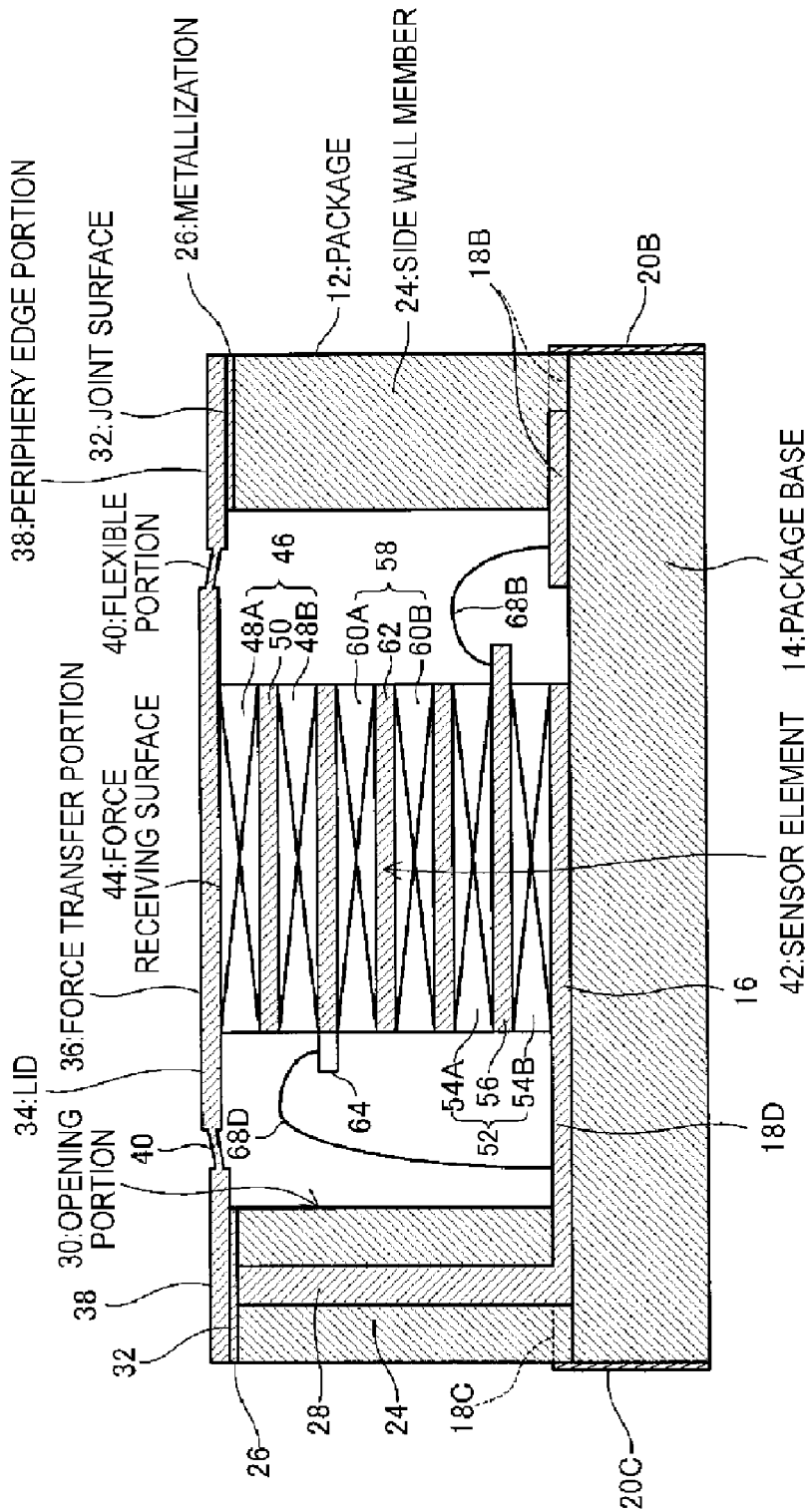
FIG. 7 is a cross-sectional view of a sensor device of a second embodiment.
Figure 8:
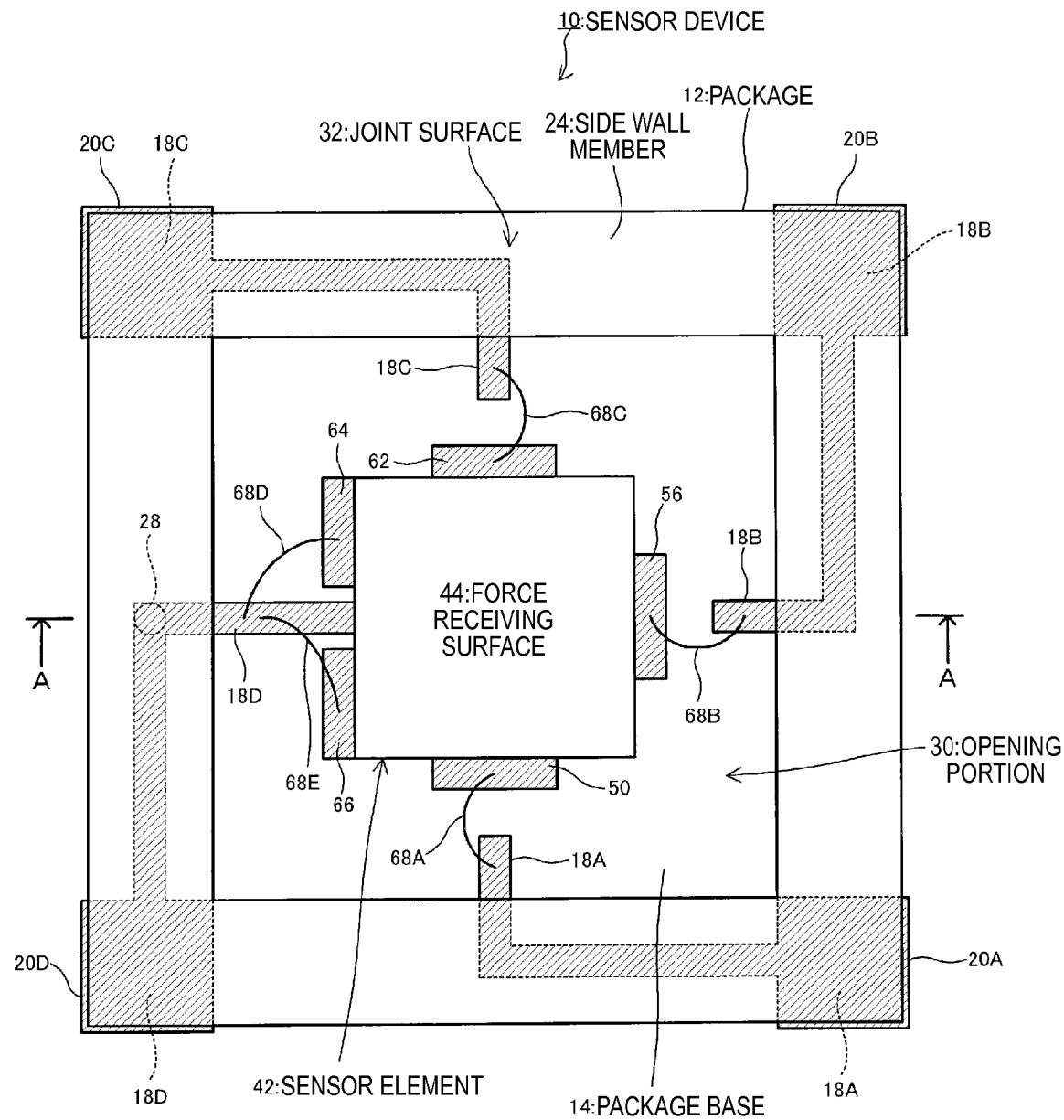
FIG. 8 is a plan view (lid is not shown) of a sensor device of a second embodiment.
Figure 9:
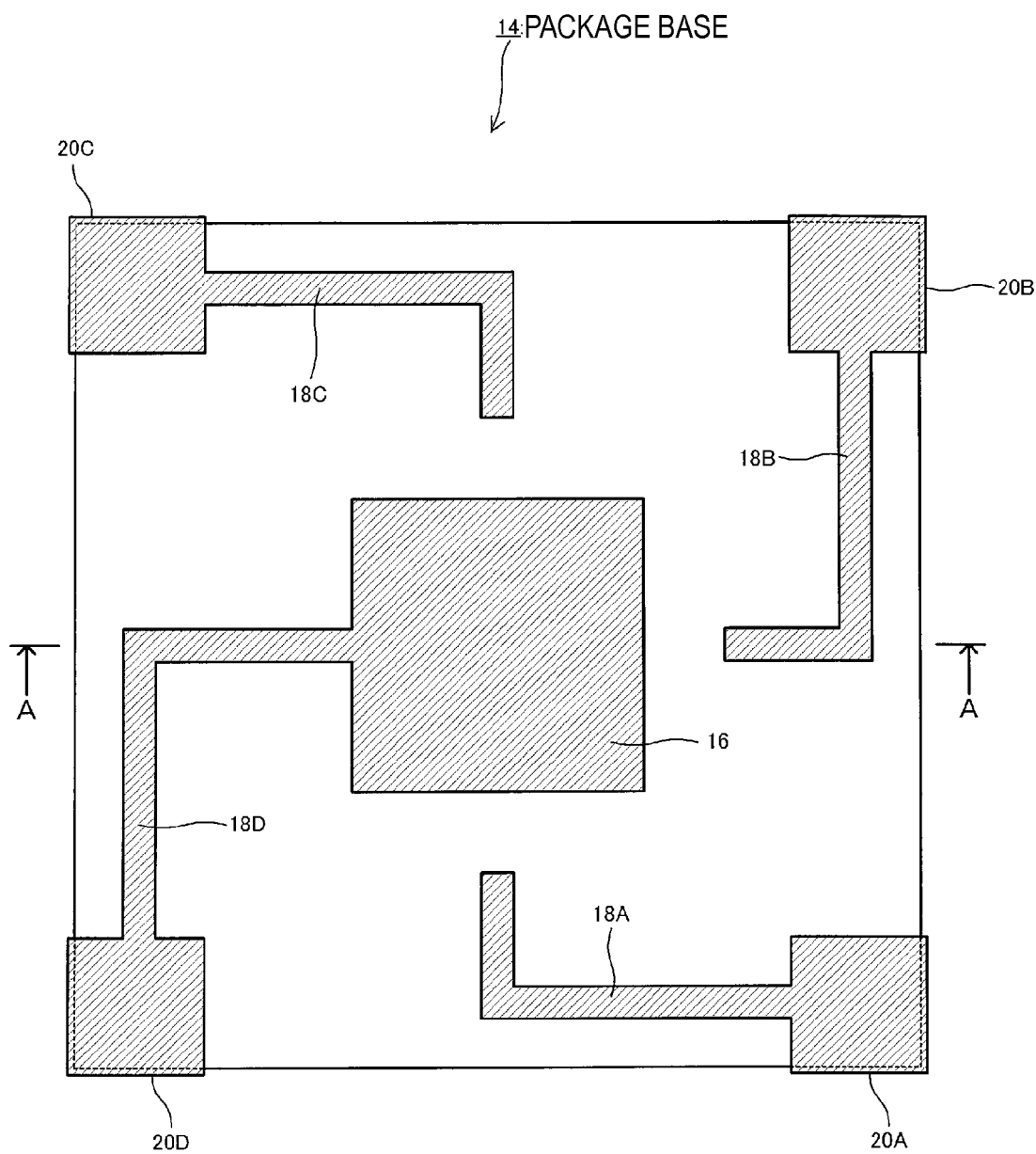
FIG. 9 is a plan view of a package base of the embodiment.

FIG. 7 shows a cross-sectional view of a sensor device of a second embodiment. FIG. 8 shows a plan view (lid is not shown) of the sensor device of the second embodiment. FIG. 9 shows a plan view of a package base of the embodiment. Herein, FIG. 7 is a cross-section taken along a line A-A of FIGS. 8 and 9. A sensor device 10 of the second embodiment is a device which is capable of sensing a force in three axis directions which are perpendicular to each other, but has the common action effect with the sensor device 1 of the first embodiment.

The sensor device 10 of the embodiment is mainly configured of a package 12 (first member), a sensor element 42, and a lid 34 (second member). In the basic configuration of the sensor device 10, the sensor element 42 is accommodated in the recess of the package 12, and the lid 34 is joined to the joint surface 32 of the package 12 so as to cover an opening portion 30 of the recess of the package 12. A flexible portion 40 is disposed between a force transfer portion 36 and a peripheral edge portion 38 of the lid 34, the flexible portion 40 performs a flexural deformation according to the difference in height between the force receiving surface 44 of the sensor element 42 and the joint surface 32, and a level difference is formed between the force transfer portion 36 and the peripheral edge portion 38. By this level difference, the peripheral edge portion 38 is joined to the joint surface 32 in a state where the force transfer portion 36 comes in contact (surface contact) with the force receiving surface 44.

The sensor device 10 of the embodiment is interposed between the pressurization plates 82 (FIG. 11) and 92 (FIG. 12) which will be described later and receives the pressure from the normal direction (γ axis direction of FIG. 10) of the force receiving surface 44 of the sensor element 42.

The package 12 is formed of an insulating material such as a ceramic. The package 12 includes a package base 14 which has a flat plate-shaped rectangle (may be other shapes such as a circle) in a plan view when seen from the depth direction of the recess of the package 12 and on which the sensor element 42 is disposed. In addition, the package 12 includes a ring-shape side wall member 24 which has the same appearance as the package base 14 in the plan view (FIG. 8) and which is disposed on the package base so as to cover the vicinity of the sensor element 42.

As shown in FIG. 9, a ground electrode 16 which is connected to the sensor element 42 is disposed in the center of the upper surface of the package base 14. In addition, side surface electrodes 20A, 20B, 20C, and 20D are disposed in the portions (4 portions) to be the corners of the side surface of the package base 14. The side surface electrodes 20A, 20B, 20C, and 20D are connected to an electronic circuit (not shown) which senses an output of the sensor device 10 through a wire or the like, for example.

In addition, as shown in FIGS. 8 and 9, connection electrodes 18A, 18B, 18C, and 18D are disposed on the upper surface of the package base 14. The connection electrodes 18A, 18B, 18C, and 18D are disposed so as to be connected to the side surface electrodes 20A, 20B, 20C, and 20D, respectively, and each of one ends are disposed in the position to be the corner of the package base 14. Meanwhile, the other ends of the connection electrodes 18A, 18B, and 18C are disposed in the position to be the vicinity of the ground electrode 16. The other end of the connection electrode 18D is connected to the ground electrode 16.

As shown in FIGS. 7 and 8, the side wall member 24 is laminated on the position to be the peripheral edge above the package base 14. The side wall member 24 is disposed so as to cover the connection electrode 18A, 18B, 18C, and 18D. However, since the side wall member 24 is a member with a ring-shaped rectangle, the other end sides of the connection electrodes 18A, 18B, 18C, and 18D are exposed to the inner side of the side wall member 24, and the ground electrode 16 is also laminated on the package base 14 in an exposed state. The side wall member 24 forms the opening portion 30 of the recess of the package 12.

As shown in FIG. 7, metallization 26 is disposed on the upper surface of the side wall member 24, and this becomes the joint surface 32 (upper surface) of the package 12 and the lid 34. As shown in FIGS. 7 and 8, a penetration electrode 28 which penetrates the side wall member 24 in the height direction is disposed in the position opposing to the connection electrode 18D of the side wall member 24, and the metallization 26 and the connection electrode 18D are electrically connected through the penetration electrode 28.

The ground electrode 16 and the connection electrodes 18A, 18B, 18C, and 18D are formed of a metal having a conductive property, and the metallization 26 can also be formed of the same material as the ground electrode 16 or the like.

As shown in FIG. 7, the lid 34 is configured of the force transfer portion 36, the peripheral edge portion 38, and the flexible portion 40, in the same manner as the lid 2 of the first embodiment. In the embodiment, the force receiving surface 44 is disposed higher than the joint surface 32 of the package 12, in the same manner as the first embodiment. Accordingly, the flexible portion 40 is deformed according to the difference in height between the force receiving surface 44 and the joint surface 32, the force transfer portion 36 comes in contact with the force receiving surface 44, and the peripheral edge portion 38 is joined to the joint surface 32 (metallization 26) by seam welding. Accordingly, the lid 34 has a level difference in a state where the force transfer portion 36 protrudes more than the peripheral edge portion 38. Of course, in a case of mass production of the sensor device 10, a variation is generated in the heights of the force receiving surface 44 and the joint surface 32 in the same manner as the first embodiment. However, the lid 34 can be joined to the package 12 with the same process as the first embodiment.

As shown in FIG. 7, the sensor element 42 is obtained by laminating, from the top, a first sensor element 46, a third sensor element 58, and a second sensor element 52 in order. The first sensor element 46 is formed so as that a first sensing electrode 50 is interposed between first crystal plates 48A and 48B, the second sensor element 52 is formed so as that a second sensing electrode 56 is interposed between second crystal plates 54A and 54B, and the third sensor element 58 is formed so as that a third sensing electrode 62 is interposed between third crystal plates 60A and 60B.

A first ground electrode 64 is disposed between the first sensor element 46 (first crystal plate 48B) and the third sensor element 58 (third crystal plate 60A) and a second ground electrode 66 is disposed between the third sensor element 58 (third crystal plate 60B) and the second sensor element 52 (second crystal plate 54A). Further, the upper surface of the first sensor element 46 (first crystal plate 48A) is set as the force receiving surface 44 of the sensor element 42, and comes in contact with the force transfer portion 36 of the lid 34 to be grounded. The lower surface of the second sensor element 52 (second crystal plate 54B) is connected to the ground electrode 16 to be grounded.

As shown in FIG. 8, the first sensing electrode 50, the second sensing electrode 56, the third sensing electrode 62, the first ground electrode 64, and the second ground electrode 66 are disposed so that each of parts thereof protrudes from the first to third crystal plates. The first sensing electrode 50 is connected to the exposed portion (other end side) of the connection electrode 18A by a conductive wire 68A, the second sensing electrode 56 is connected to the exposed portion (other end side) of the connection electrode 18B by a wire 68B, and the third sensing electrode 62 is connected to the exposed portion (other end side) of the connection electrode 18C by a wire 68C. In addition, the first ground electrode 64 and the second ground electrode 66 are connected to the exposed portion (other end side) of the connection electrode 18D by wires 68D and 68E, respectively.

By the connections described above, the side surface electrode 20A is electrically connected to the first sensing electrode 50 through the connection electrode 18A and the wire 68A. The side surface electrode 20B is electrically connected to the second sensing electrode 56 through the connection electrode 18B and the wire 68B. The side surface electrode 20C is electrically connected to the third sensing electrode 62 through the connection electrode 18C and the wire 68C.

In addition, the side surface electrode 20D is electrically connected to the ground electrode 16 through the connection electrode 18D. Further, the side surface electrode 20D is electrically connected to the first ground electrode 64 through the wire 68D which is connected to the connection electrode 18D, is electrically connected to the second ground electrode 66 through the wire 68E which is connected to the connection electrode 18D, and is electrically connected to the lid 34 through the penetration electrode 28 which is connected to the connection electrode 18D and the metallization 26.

As materials of various electrodes described above, a single substance of gold, titanium, aluminum, copper, or iron, or an alloy thereof can be used. For example, stainless steel can be used as an iron alloy and it is preferably used since it has superior durability and corrosion resistance.

Figure 10:
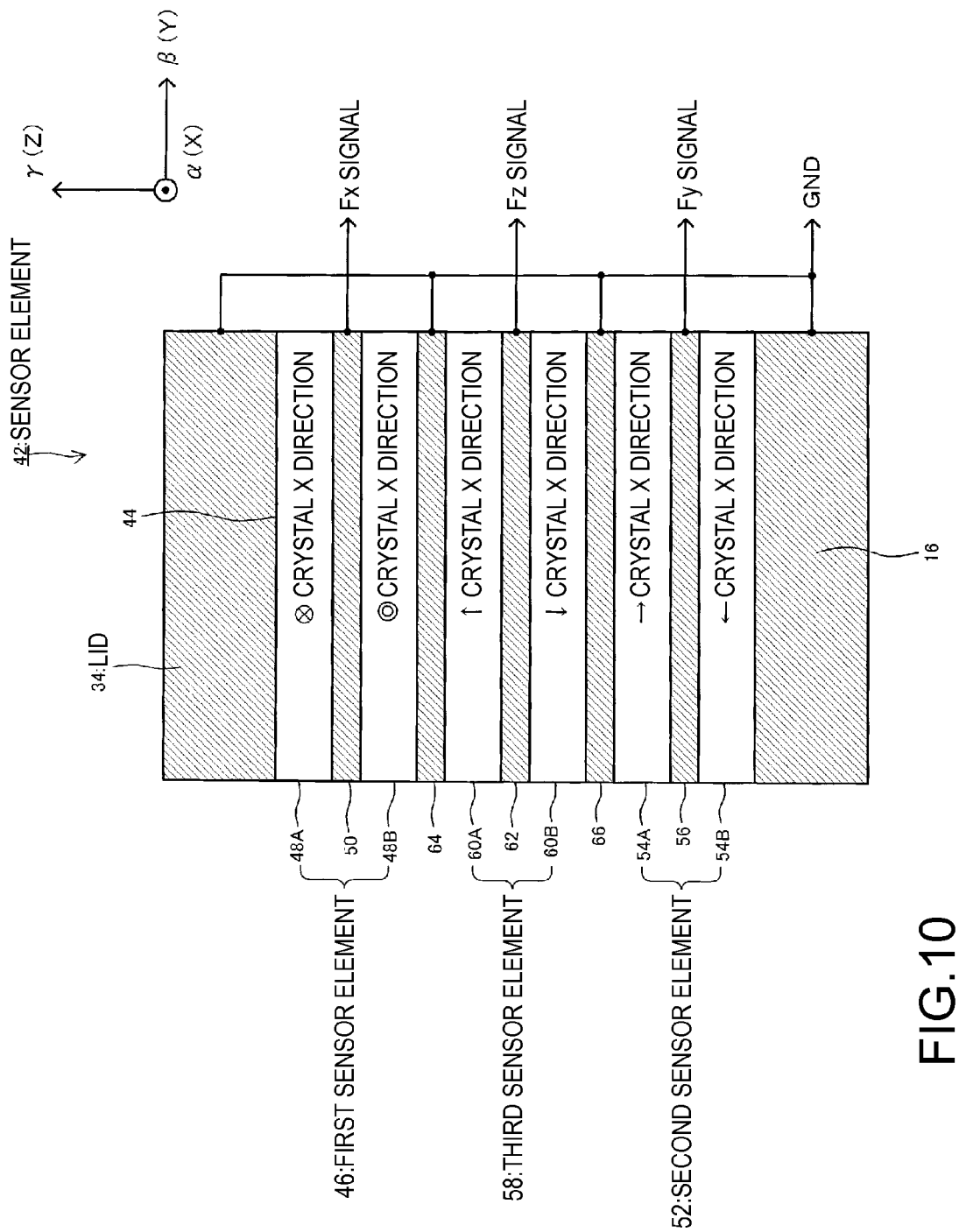
FIG. 10 is a schematic view of a sensor element of the embodiment.

FIG. 10 is a schematic view of a sensor element of the embodiment. In the embodiment, the force transfer portion 36 can transfer not only the force in a direction parallel to the normal direction (γ axis) of the force receiving surface 44 of the sensor element 42, but also a force in the surface direction of the force receiving surface 44, that is, a force in two directions (α axis and β axis) which are perpendicular to γ axis, respectively, and perpendicular to each other, to the force receiving surface 44. The sensor element 42 (first sensor element 46, second sensor element 52, and third sensor element 58) can sense the forces in directions parallel to the α axis, the β axis, and the γ axis which will be described later.

In the first sensor element 46, the first crystal plates 48A and 48B are formed of a Y-cut crystal plate, and include a crystal orientation in which the X direction which is a crystal orientation generating the piezoelectric effect is a direction which is perpendicular to the normal line (direction parallel to the γ axis of FIG. 10) of the first crystal plates 48A and 48B. The first crystal plates 48A and 48B are disposed so that the X directions are inverse directions from each other. In addition, the first crystal plates 48A and 48B are disposed so that the X directions are parallel to the α axis of Cartesian space.

In the second sensor element 52, the second crystal plates 54A and 54B are formed of a Y-cut crystal plate, and include a crystal orientation in which the X direction is perpendicular to the normal line (direction parallel to the γ axis) of the second crystal plates 54A and 54B. The second crystal plates 54A and 54B are disposed so that the X directions are inverse directions from each other. In addition, the second crystal plates 54A and 54B are disposed so that the X directions are parallel to the β axis of Cartesian space.

In the third sensor element 58, the third crystal plates 60A and 60B are formed of an X-cut crystal plate, and include a crystal orientation in which the X direction is parallel to the normal line (direction parallel to the γ axis) of the third crystal plates 60A and 60B. The third crystal plates 60A and 60B are disposed so that the X directions are inverse directions from each other. In addition, the third crystal plates 60A and 60B are disposed so that the X directions are parallel to the γ axis of Cartesian space.

As shown in FIG. 10, in the sensor element 42 of the embodiment, the direction parallel to the γ axis of Cartesian space is set as a height direction of the sensor element 42. For example, the sensor element 42 is interposed between the pressurization plates 82 (FIG. 11) and 92 (FIG. 12) which will be described later, receives the pressure from the direction of the γ axis, and receives the pressure from the direction parallel to the γ axis through the lid 34 (force transfer portion 36). Accordingly, since the third crystal plates 60A and 60B receive the pressure (compressive force) from the X direction, an electric charge is induced by the piezoelectric effect, and the electric charge (Fz signal) is output to the third sensing electrode 62.

In the configuration, if an external force, by which the relative positions of two pressurization plates deviate in the direction parallel to the α axis from each other, is applied, the external force in the direction parallel to the α axis is applied to the sensor element 42 through the force transfer portion 36. Then, since the first crystal plates 48A and 48B receive the external force (shear force) from the X direction, an electric charge is induced by the piezoelectric effect, and the electric charge (Fx signal) is output to the first sensing electrode 50.

If an external force, by which the relative positions of two pressurization plates deviate in the direction parallel to the β axis from each other, is applied, the external force in the direction parallel to the β axis is applied to the sensor element 42 through the force transfer portion 36. Then, since the second crystal plates 54A and 54B receive the external force (shear force) from the X direction, an electric charge is induced by the piezoelectric effect, and the electric charge (Fy signal) is output to the second sensing electrode 56.

Further, if an external force, by which the relative positions of two pressurization plates deviate in the direction parallel to the γ axis from each other, is applied, the external force in the direction parallel to the γ axis is applied to the sensor element 42 through the force transfer portion 36. Then, since the third crystal plates 60A and 60B receive the external force (force of compression or tension) from the X direction, the amount of the electric charge induced from the piezoelectric effect is changed, and the electric charge (Fz signal) which is output to the third sensing electrode 62 is changed in magnitude.

Accordingly, the sensor device 10 of the embodiment can monitor each of the electric charge (Fx signal) which is output to the first sensing electrode 50 through the side surface electrode 20A, the electric charge (Fy signal) which is output to the second sensing electrode 56 through the side surface electrode 20B, and the electric charge (Fz signal) which is output to the third sensing electrode 62 through the side surface electrode 20C, and it is possible to sense the external forces (Fx, Fy, and Fz) in the directions parallel to the α axis (the X axis which will be described later), the β axis (the Y axis which will be described later), and the γ axis (the Z axis which will be described later) which are perpendicular to each other. The sensor element 42 has a laminated structure of the first sensor element 46, the second sensor element 52, and the third sensor element 58, however, it may have a configuration using at least one or more thereof. In addition, it is not necessary to laminate the first sensor element 46, the second sensor element 52, and the third sensor element 58, and a structure in which each sensor elements are accommodated in the package 12 in parallel with each other and the upper surface (force receiving surface) of each sensor element comes in contact with the force transfer portion 36, may be used.

Figure 11:
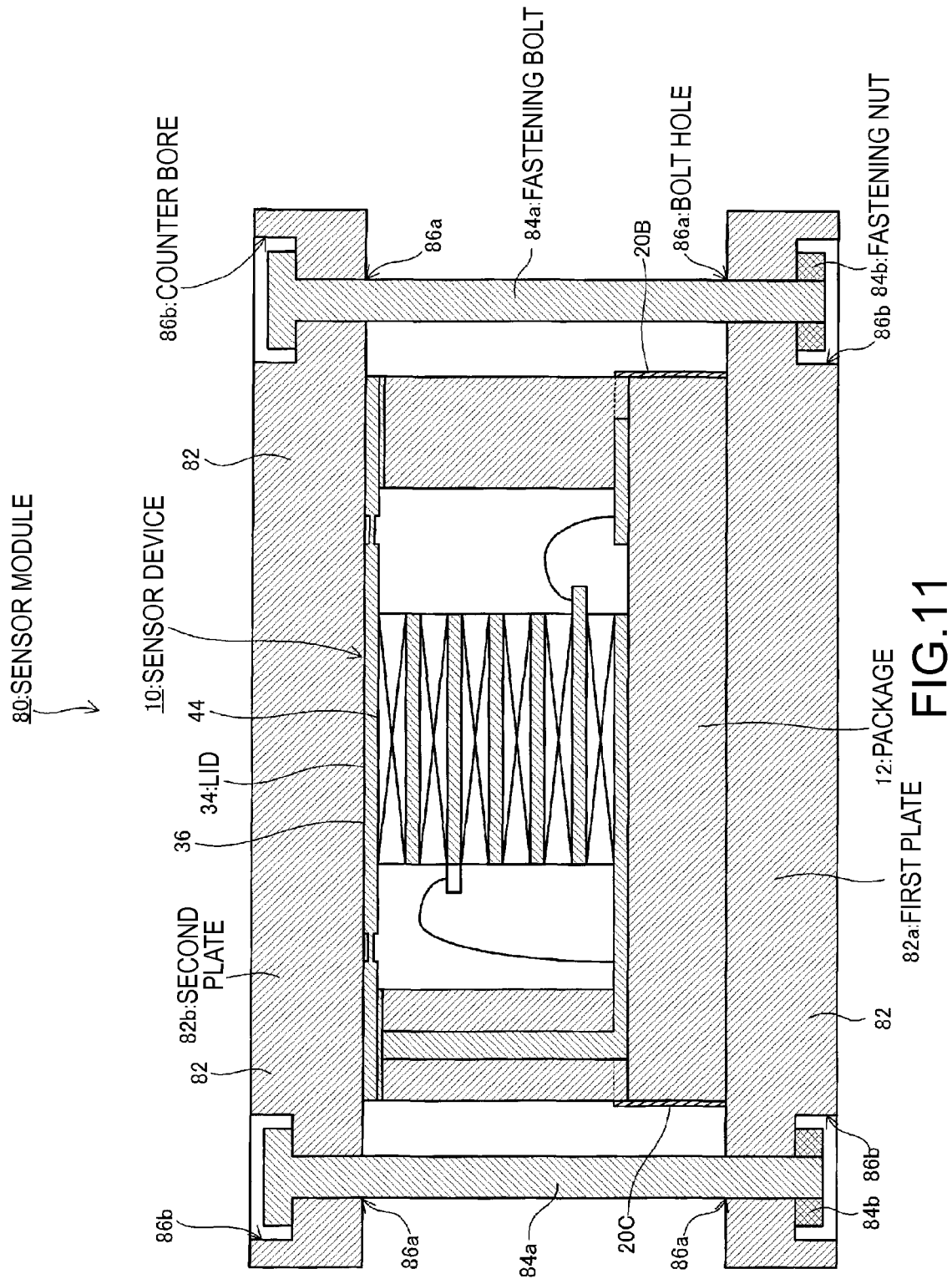
FIG. 11 is a cross-sectional view of a sensor module of the embodiment.

FIG. 11 is a cross-sectional view of a sensor module of the embodiment. The sensor module of the embodiment has a configuration in which the sensor device 10 of the second embodiment (may be the sensor device 1 of the first embodiment) is interposed between the pressurization plates 82, and the pressurization plates 82 are fastened to each other by a fastening portion, and the pressure is applied to the sensor device 10.

The pressurization plates 82 are configured of a first plate 82a which comes in contact with the package 12 and a second plate 82b which comes in contact with the lid 34 (force transfer portion 36). The fastening portion is configured of a fastening bolt 84a and a fastening nut 84b. In addition, a bolt hole 86a to which the fastening bolt 84a is inserted is formed in the first plate 82a and the second plate 82b, and a counter bore 86b which accommodates the head portion of the fastening bolt 84a and the fastening nut 84b is formed in communication with the bolt hole 86a.

Herein, in a state where the sensor device 10 is interposed between the first plate 82a and the second plate 82b, the fastening bolt 84a is inserted to the bolt hole 86a and bolting is performed by the fastening bolt 84a and the fastening nut 84b. Then, the sensor device 10 receives a force in a direction making the first plate 82a and the second plate 82b approach each other due to the fastening portion, and receives pressure from the height direction, and thus, the lid 34 (force transfer portion 36) configuring the sensor device 10 applies the pressure to the force receiving surface 44 of the sensor element 42.

In the same manner as described above, the side surface electrodes 20A, 20B, 20C, and 20D are connected to an electronic circuit (not shown) which receives the signal from the sensor device 10. Accordingly, if an external force is applied to the pressurization plates 82, the external force is transferred to the force receiving surface 44 through the force transfer portion 36 to change the force to be received by the force receiving surface 44, and accordingly, the output of the signal to be output from the sensor device 10 changes. Accordingly, it is possible to sense the force applied to the sensor module 80 (including the direction thereof) by monitoring the amount of change in the output of signal thereof, with an output of the signal in a case of only the pressurization as a reference. The electronic circuit (not shown) maybe built in a position opposing to the sensor device 10 of the first plate 82a, the side surface electrodes 20A, 20B, 20C, and 20D of the sensor device 10 may be exposed up to the lower surface of the package 12, and mounted electrodes (not shown) on the electronic circuit (not shown) can be connected to the portions of the side surface electrodes exposed to the lower surface of the package 12 by soldering or the like.

Figure 12:
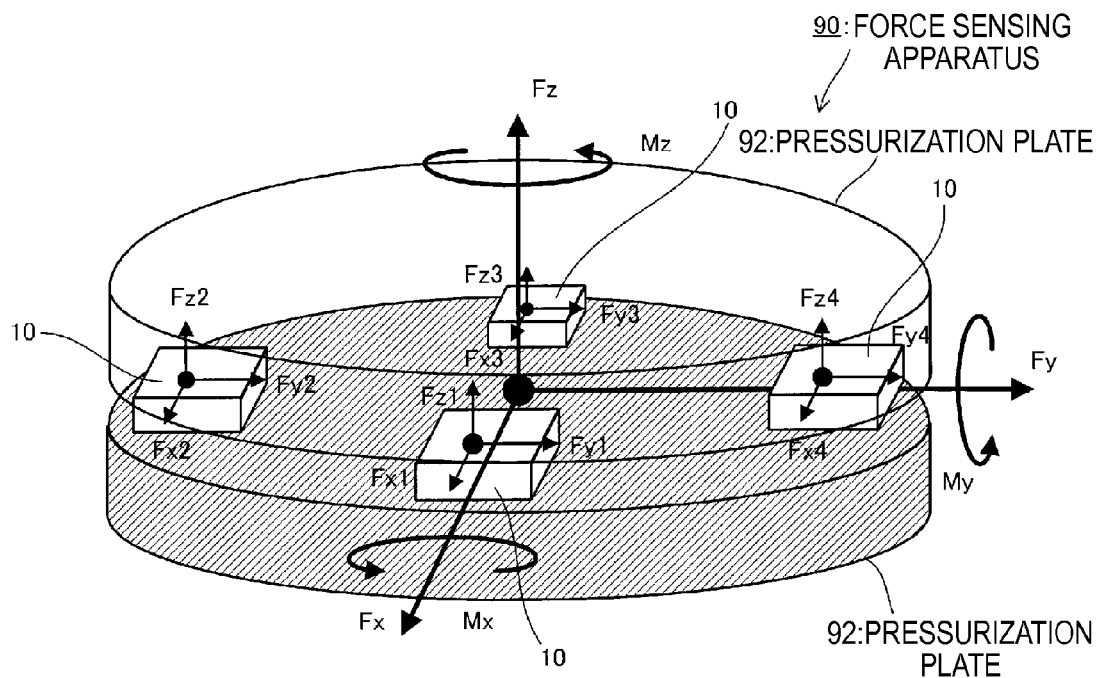
FIG. 12 is a schematic view of a force sensing apparatus of the embodiment.

FIG. 12 is a schematic view of a force sensing apparatus of the embodiment. A force sensing apparatus 90 of the embodiment has a configuration in which the four sensor devices 10 are interposed between two pressurization plates 92. An electronic circuit (not shown) which is electrically connected to the sensor devices 10 through a wire or the like is disposed in one pressurization plate 92 of the pressurization plates 92. In the force sensing apparatus 90, the four sensor devices 10 are interposed between the pressurization plates 92 in a state where all of the sensor devices face the same direction, and receive the pressure. For example, the sensor devices 10 are in a state where a sensing axis of the first sensor element 46 (FIG. 10) faces a direction parallel to the Fx (X axis), a sensing axis of the second sensor element 52 (FIG. 10) faces a direction parallel to the Fy (Y axis), and a sensing axis of the third sensor element 58 (FIG. 10) faces a direction parallel to the Fz (Z axis).

Herein, in a case of receiving a force by which the relative positions of the pressurization plates 92 deviate in the Fx direction from each other, the sensor devices 10 sense forces of Fx1, Fx2, Fx3, and Fx4. In a case of receiving a force by which the relative positions of the pressurization plates 92 deviate in the Fy direction from each other, the sensor devices 10 sense forces of Fy1, Fy2, Fy3, and Fy4. In addition, in a case of receiving a force by which the relative positions of the pressurization plates 92 deviate in the Fz direction from each other, the sensor devices 10 sense forces of Fz1, Fz2, Fz3, and Fz4. The pressurization plates 92 can perform a relative displacement to deviate in a direction rotating around the X axis (Mx) from each other, a relative displacement to deviate in a direction rotating around the Y axis (My) from each other, and a relative displacement to deviate in a direction rotating around the Z axis (Mz) from each other, and the forces accompanied with this can be transferred to the sensor device 10.

Accordingly, in the force sensing apparatus 90, the forces Fx, Fy, and Fz which are perpendicular to each other, and a rotating force Mx with a direction parallel to the Fx as a rotating axis, a rotating force My with a direction parallel to the Fy as a rotating axis, and a rotating force Mz with a direction parallel to the Fz as a rotating axis can be obtained by as follows.

$Fx=Fx1+Fx2+Fx3+Fx4$ $Fy=Fy1+Fy2+Fy3+Fy4$ $Fz=Fz1+Fz2+Fz3+Fz4$ $Mx=bx(Fz4-Fz2)$ $My=ax(Fz3-Fz1)$ $Mz=bx(Fx2-Fx4)+ax(Fy1-Fy3)$

Herein, a and b are constants. Accordingly, the force sensing apparatus 90 of the embodiment is the force sensing apparatus 90 which can sense the forces (forces in six axis directions) from the various three-dimensional directions, and stably realizes the air-tight sealing of the sensor element 42 accommodated in the package 12 over a long period.

Figure 13:
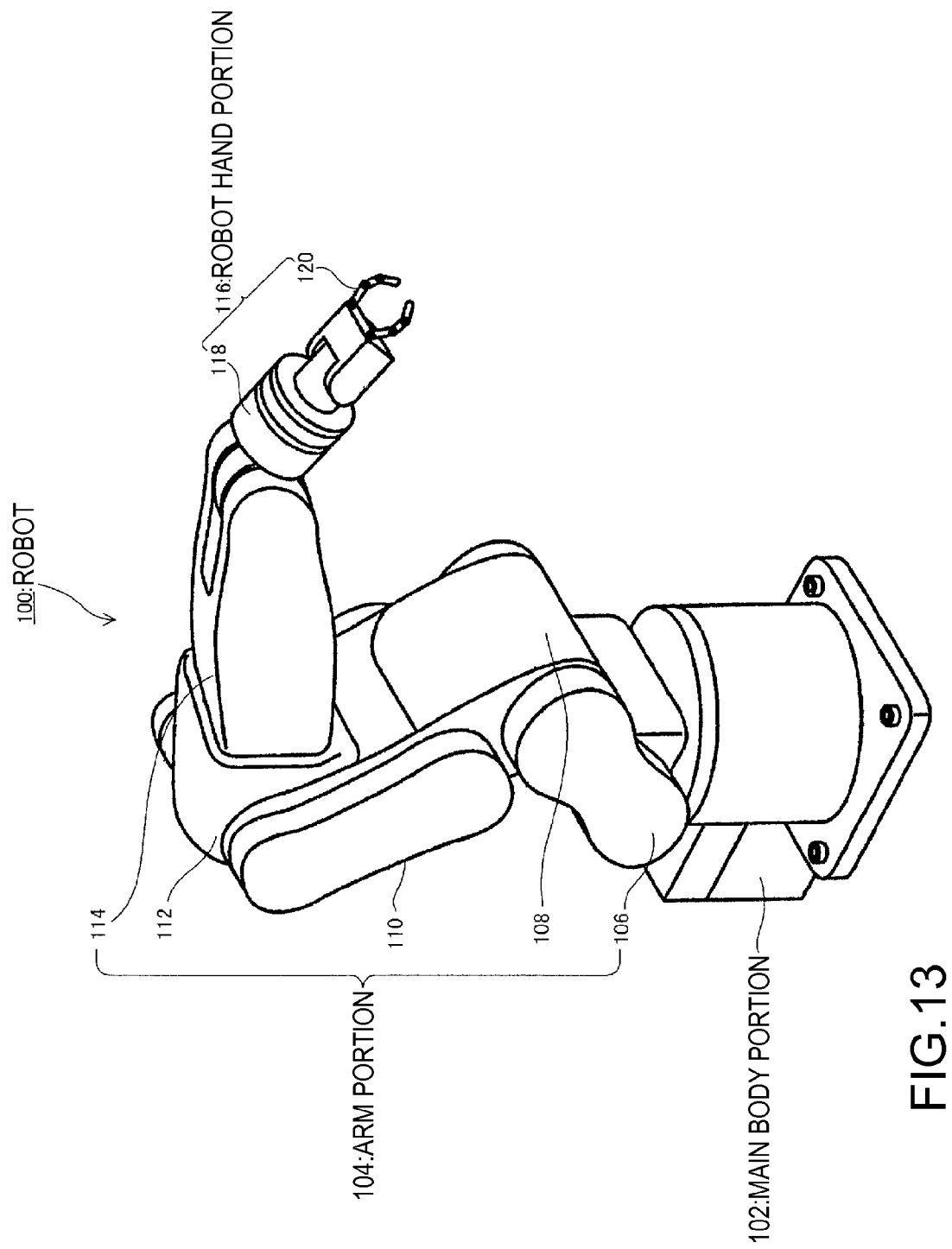
FIG. 13 is a schematic view of a robot on which a force sensing apparatus of the embodiment is mounted.
Figure 14:
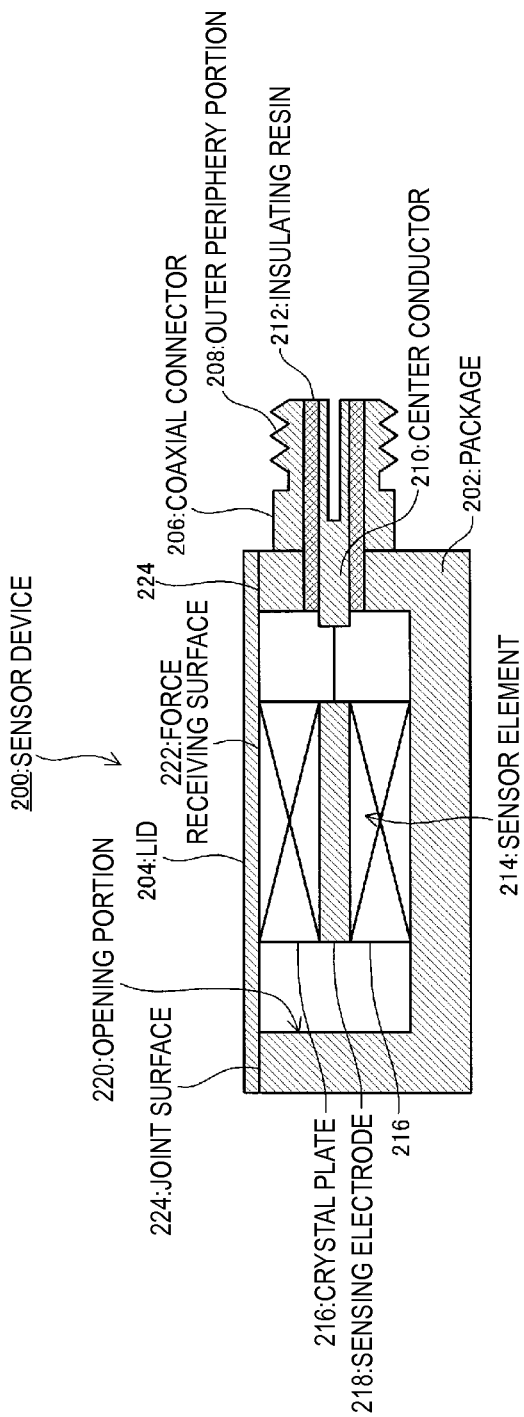
FIG. 14 is a schematic view of a sensor device of the related art.
Figure 15A:
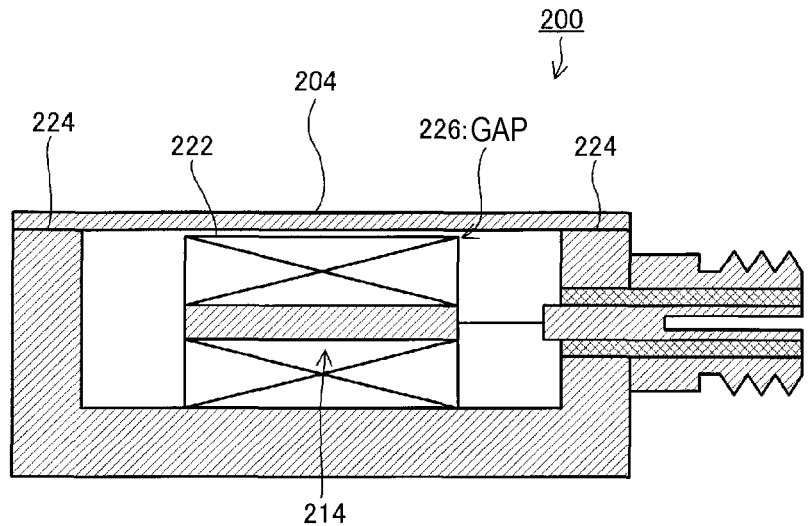
Figure 15B:
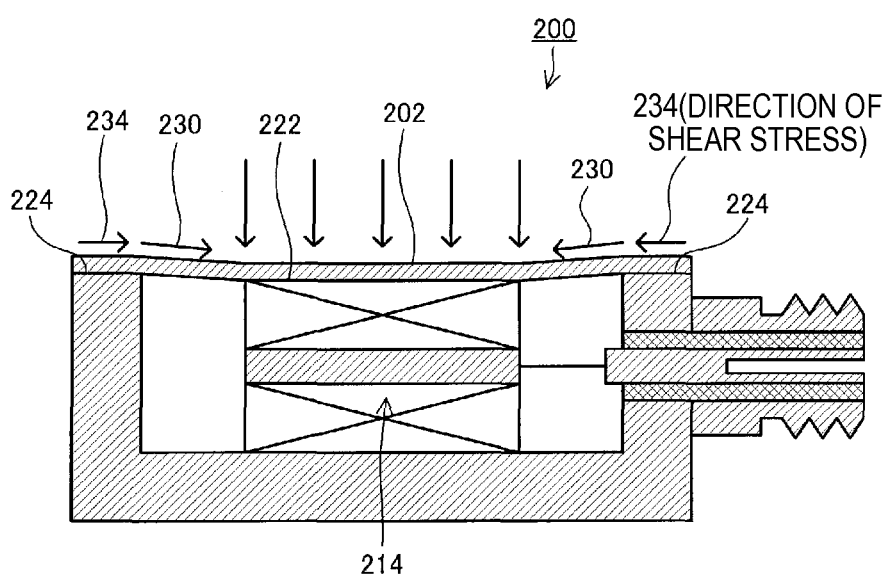
Figure 16A:
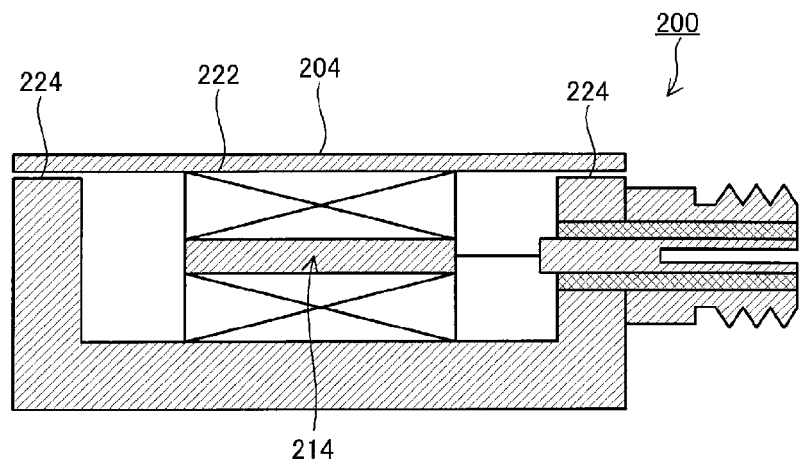
Figure 16B:
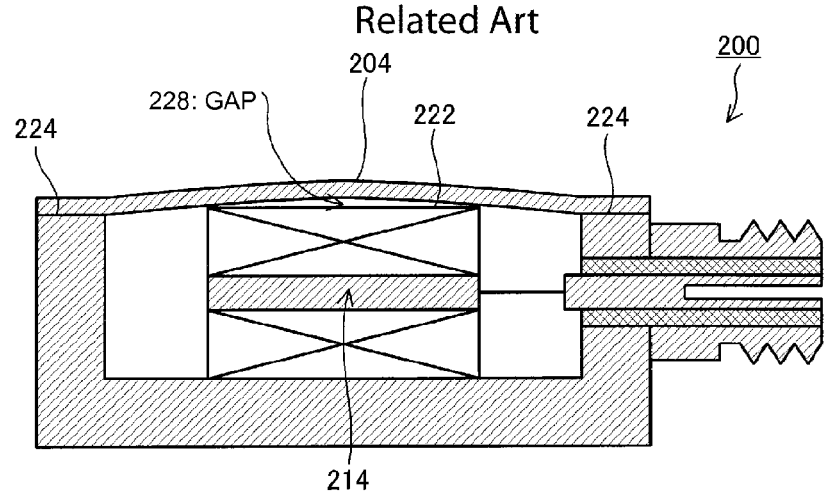
Figure 16C:
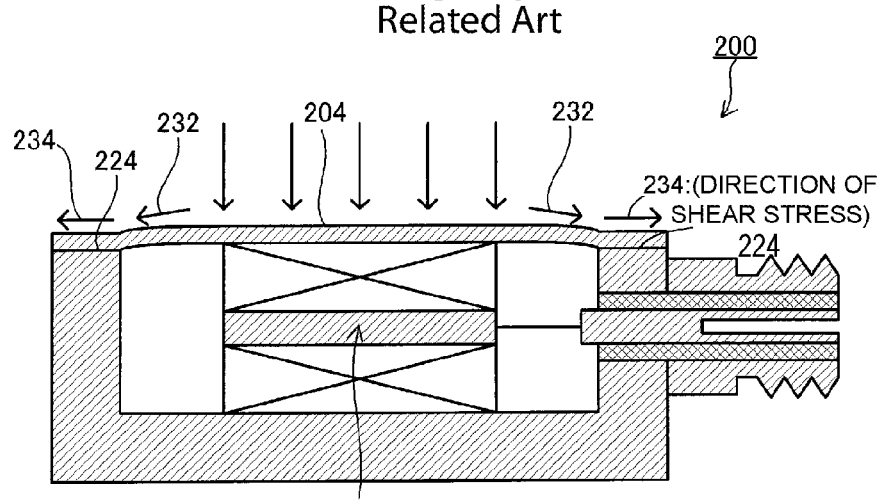

FIG. 13 shows a robot on which the force sensing apparatus of the embodiment is mounted. As shown in FIG. 13, a robot 100 is configured of a main body portion 102, an arm portion 104, a robot hand portion 116, and the like. The main body portion 102 is fixed onto a floor, a wall, a ceiling, or a movable carriage, for example. The arm portion 104 is provided to be movable compared to the main body portion 102, and an actuator (not shown) generating power for rotating the arm portion 104 or a control unit (not shown) which controls the actuator and the like are embedded in the main body portion 102.

The arm portion 104 is configured of a first frame 106, a second frame 108 a third frame 110, a fourth frame 112, and a fifth frame 114. The first frame 106 is rotatably or bendably connected to the main body portion 102, through a rotating and bending axis. The second frame 108 is connected to the first frame 106 and the third frame 110, through a rotating and bending axis. The third frame 110 is connected to the second frame 108 and the fourth frame 112, through a rotating and bending axis. The fourth frame 112 is connected to the third frame 110 and the fifth frame 114, through a rotating and bending axis. The fifth frame 114 is connected to the fourth frame 112, through a rotating and bending axis. The arm portion 104 is driven by a complex rotation or bending of each frame around each rotating and bending axis under the control of the control unit.

A robot hand portion 116 is attached to the distal end of the fifth frame 114, and the robot hand 120 which can hold an object is connected to the fifth frame 114 through a robot hand connection portion 118 in which a motor (not shown) for rotating motion is embedded.

The force sensing apparatus 90 (FIG. 12) described above is embedded in the robot hand connection portion 118 in addition to the motor, and when the robot hand portion 116 is moved to a predetermined motion position under the control of the control unit, contacting an obstacle, contacting an object by a motion command passing the predetermined position, and the like can be sensed by the force sensing apparatus 90 as the forces, and can be fed back to the control unit of the robot 100, and then, the avoidance motion can be performed.

By using the robot 100 described above, the avoidance motion from the obstacle, the avoidance motion from the object damage, and the like which are difficult to handle with the position control of the related art, can be easily performed, and it is possible to provide the robot 100 capable of safe and complicated operations. It is possible to provide the robot 100 in which the sensing of the force can be stably performed with a high degree of precision even with a small amount of displacement. In addition, the invention can also be applied to a dual-arm robot, without limiting the embodiment.

The entire disclosure of Japanese Patent Application No. 2011-278968 filed Dec. 20, 2011 is expressly incorporated by reference herein.

What is claimed is:
1. A sensor device comprising:
a first member that includes a recess;

a sensor element that is disposed in the recess and includes a piezoelectric body; and a second member that is joined to the first member and seals the recess of the first member, wherein the sensor element includes a contacting surface that comes in contact with the second member, the second member includes:

a first surface region that comes in contact with the contacting surface of the sensor element, a second surface region that is joined to the first member, and a flexible portion that is disposed between the first surface region and the second surface region, and wherein, when a normal direction of the contacting surface of the sensor element is set as a γ axis direction, and directions which are perpendicular to the γ axis direction and perpendicular to each other are set as a α axis direction and a β axis direction, respectively, the sensor element includes at least one of a first sensor element that senses a force in the α axis direction, a second sensor element that senses a force in the β axis direction, and a third sensor element that senses a force in the γ axis direction.

2. The sensor device according to claim 1, wherein the flexible portion is thinner than the first and second surface regions of the second member.

3. A force sensing apparatus comprising the sensor device according to claim 2.

4. The sensor device according to claim 1, wherein the flexible portion has a bellows structure.

5. A force sensing apparatus comprising the sensor device according to claim 4.

6. The sensor device according to claim 1, wherein the flexible portion has a circular shape or a polygonal shape with arcuate corners in a plan view.

7. A force sensing apparatus comprising the sensor device according to claim 6.

8. A force sensing apparatus comprising the sensor device according to claim 1.

9. A robot comprising the force sensing apparatus according to claim 8.

10. A sensor module, comprising:

a sensor device including:

a first member that includes a recess, a sensor element that is disposed in the recess and includes a piezoelectric body, and a second member that is joined to the first member and seals the recess of the first member;

a first plate that comes in contact with the first member;

a second plate that comes in contact with the second member; and a fastening portion that fastens the first plate and the second plate, wherein the sensor element includes a contacting surface that comes in contact with the second member, the second member includes:

a first surface region that comes in contact with the contacting surface of the sensor element, a second surface region that is joined to the first member, and a flexible portion that is disposed between the first surface region and the second surface region, and wherein, when a normal direction of the contacting surface of the sensor element is set as a γ axis direction, and directions which are perpendicular to the γ axis direction and perpendicular to each other are set as a α axis direction and a β axis direction, respectively, the sensor element includes at least one of a first sensor element that senses a force in the α axis direction, a second sensor element that senses a force in the β axis direction, and a third sensor element that senses a force in the γ axis direction.

11. A force sensing apparatus comprising:

a first member that includes a recess;

a sensor element that is disposed in the recess and includes a piezoelectric body;

a second member that is joined to the first member and seals the recess of the first member; and an electronic circuit that is electrically connected to the sensor element, wherein the sensor element includes a contacting surface that comes in contact with the second member, the second member includes:

a first surface region that comes in contact with the contacting surface of the sensor element, a second surface region that is joined to the first member, and a flexible portion that is disposed between the first surface region and the second surface region, and wherein, when a normal direction of the contacting surface of the sensor element is set as a γ axis direction, and directions which are perpendicular to the γ axis direction and perpendicular to each other are set as a α axis direction and a β axis direction, respectively, the sensor element includes at least one of a first sensor element that senses a force in the α axis direction, a second sensor element that senses a force in the β axis direction, and a third sensor element that senses a force in the γ axis direction.

12. A robot comprising:

a main body portion;

an arm portion that is connected to the main body portion;

a hand portion that is connected to the arm portion; and a sensor device in a connecting portion connecting the arm portion and the hand portion, wherein the sensor device includes:

a first member that includes a recess, a sensor element that is disposed in the recess and includes a piezoelectric body, and a second member that is joined to the first member and seals the recess of the first member, the sensor element includes a contacting surface that comes in contact with the second member, the second member includes:

a first surface region that comes in contact with the contacting surface of the sensor element, a second surface region that is joined to the first member, and a flexible portion that is disposed between the first surface region and the second surface region, and wherein, when a normal direction of the contacting surface of the sensor element is set as a γ axis direction, and directions which are perpendicular to the γ axis direction and perpendicular to each other are set as a α axis direction and a β axis direction, respectively, the sensor element includes at least one of a first sensor element that senses a force in the α axis direction, a second sensor element that senses a force in the β axis direction, and a third sensor element that senses a force in the γ axis direction.

13. A sensor device comprising:

a housing including a recess defined by a base and a circumferential wall;

a sensor element in the recess and including a piezoelectric body; and a lid joined to the circumferential wall and hermetically sealing an interior of the recess with the sensor element therein, wherein the sensor element includes a contacting surface adapted to contact the lid, the lid includes a flexible portion surrounding the contacting surface of the sensor, the flexible portion being inboard of the circumferential wall of the housing, and wherein, when a normal direction of the contacting surface of the sensor element is set as a $\gamma$ axis direction, and directions which are perpendicular to the $\gamma$ axis direction and perpendicular to each other are set as a $\alpha$ axis direction and a $\beta$ axis direction, respectively, the sensor element includes at least one of a first sensor element that senses a force in the $\alpha$ axis direction, a second sensor element that senses a force in the $\beta$ axis direction, and a third sensor element that senses a force in the $\gamma$ axis direction.

14. The sensor device according to claim 13, wherein the flexible portion is a thinned portion of the lid.

15. The sensor device according to claim 13, wherein the flexible portion has a bellows structure.

16. The sensor device according to claim 13, wherein the flexible portion has a circular shape or a polygonal shape with arcuate corners in a plan view.

* * * * *